United States Patent Office 3,573,158
Patented Mar. 30, 1971

3,573,158
MICROPOROUS FIBROUS SHEETS USEFUL FOR
FILTERS AND APPARATUS AND METHOD OF
FORMING THE SAME
David B. Pall, Roslyn Estates, and Cyril A. Keedwell,
Jericho, N.Y., assignors to Pall Corporation, Glen Cove,
N.Y.
Continuation-in-part of applications Ser. No. 98,595,
Mar. 27, 1961, now Patent No. 3,238,056, Ser. No.
215,151, Aug. 6, 1962, now Patent No. 3,246,767, and
Ser. No. 530,735, Feb. 28, 1966, now Patent No.
3,353,682. This application Nov. 20, 1967, Ser. No.
684,175
Int. Cl. D21f 11/14, 1/06
U.S. Cl. 162—131          23 Claims

ABSTRACT OF THE DISCLOSURE

A process is provided for forming microporous sheet material useful as filters, which is substantially uniform in thickness, porosity and density, from a slurry of particulate material.

A porous sheet material also is provided, with one or a plurality of layers, each composed of a microporous multistratum layer which may optionally be adherent to a porous substrate and having a high voids volume, a pore size of less than 25μ, and substantially uniform in thickness, porosity and density.

An apparatus is provided useful for preparing such material, such as a Fourdrinier machine, including one or more barriers such as doctor blades positioned to control deposition of slurried particulate material upon a support so that the deposition of deflocculated and uniformly flocculated material is uniform, and large non-uniform flocs cannot be deposited on the support.

This application is a continuation-in-part of Ser. No. 98,595, filed Mar. 27, 1961, now U.S. Pat. No. 3,238,056, of Ser. No. 215,151, filed Aug. 6, 1962, now U.S. Pat. No. 3,246,767, and Ser. No. 530,735, filed Feb. 28, 1966, now U.S. Pat. No. 3,353,682.

This invention relates to microporous fluid-permeable fibrous materials such as filters, and to process and apparatus for preparing such materials, characterized by high voids volume, high permeability to fluids, and uniform thickness, density and porosity, by laydown of a microporous multistratum layer on a porous base or substrate by flow through the porous base or substrate of a dispersion of fibrous material. The layer has a pore diameter of less than about 25 microns, and the material can have one or more separately formed adjacent microporus multistratum layers, with all such layers interlocked and bonded together.

THE PRIOR ART

Filter media can generally be classified as being of one of two types, depth filters and surface filters. A surface filter is one which has pores of substantially the same size and configuration extending from one surface of the filter to the other. Such a filter need not have an appreciable thickness since it removes suspended material from the fluid passed through the filter by collecting such material on its surface, and the material thus removed forms a filter cake or bed upon the filter.

In depth filtration, the filter element is designed to remove contaminants not only on the surface of the element but also as the fluid passes through the element, which has a considerable thickness and which has a plurality of pores of distinct length. The length of the pores increases the dirt capacity, because there is more room for dirt along the pores. Most depth filters are made of masses of fibers or other particulate material, held together by mechanical means or by bonding. One or several layers of such materials can be employed, and these layers can vary in porosity, with the coarsest layer usually arranged to first contact the suspended material, thereby removing from the fluid medium first the coarser and then the finer material as it passes through the filter, thus obtaining some distribution of the contaminants through the filter, and obtaining an extended life as compared to a surface filter.

A most difficult type of filter to manufacture, whether of the surface or depth type, is one having ultrafine or micro pores whose maximum diameter is 25 microns or less, and which has no pores beyond the permissible maximum. Microporous membrane filters have been developed such as, for example, those described in U.S. Pats. Nos. 1,421,341 to Zsigmondy; 1,693,890, and 1,720,670 to Duclaux; 2,783,894 to Dovell et al.; 2,864,777 to Robinson; and 2,944,017 to Cotton. These filters are, however, quite dependent upon the physical properties of the plastic material used in their preparation, are frequently brittle and fragile, especially if pore volume is high, deteriorate rapidly when exposed to temperatures of about 200° to 250° F., and are in any case expensive compared to similar porous media of comparable properties but unduly large pores, such as paper and nonwoven fibrous bats.

In order to overcome their fragility, it has been proposed to lay them down on a paper base, but it is hard to obtain good adhesion between the plastic and the paper, so that the membrane separates or breaks when bent or upon application of an appreciable back pressure differential. For these reasons, plastic membrane composites can be used only in flat sheet, and not in the more efficient pleated filter elements.

Reinforced microporous plastic membranes in which the membrane is laid down on a fabric have been prepared, but since these are not sufficiently self-supporting or rigid, the layers tend to separate when formed into pleated structures.

The available paper filters are economical, but unfortunately do not have ultrafine pores. Paper filters having ultrafine pores of about 2 to 4 microns are manufactured but such products also have a proportion of pores ranging up to 20 microns or more. It is very difficult if not impossible to prepare, at a reasonable cost, papers having both a useful voids volume and substantially no pores more than 10 microns in diameter. This is also true of conventional nonwoven fibrous bats. In addition, such ultrafine pore papers or nonwoven fibrous bats are generally characterized by extremely low fluid permeability, and a high pressure drop, due to a voids volume of between about 20 and 40%, too low for use in many applications, including the filtration of large quantities of viscous fluids.

Fourdrinier machines are normally used in the manufacture of paper and other fibrous material. Such a machine comprises an endless porous support such as a wire mesh belt which travels about two spaced-apart rollers, one of which is referred to as the breast roll, and a series of smaller rollers called table rolls, a head box for delivering feed stock to the wire belt position in close proximity to the breast roll, a series of vacuum boxes, and a series of dryers. In normal operation, a feed stock suspension of fibrous material stored in the head box is flowed over an apron, under or past a slice or doctor blade, and onto the wire belt, through which the suspending fluid is drawn off to deposit the fibrous material and form the sheet. The slice regulates the thickness of the initial layer of feed stock suspension coming onto the wire. In some machines, the slice can be raised or lowered to give a measure of control of the depth of the suspension layer and thus, the approximate sheet thickness finally formed. The layer of feed stock is allowed to gravity settle for a short period and is passed over a series of vacuum boxes which draw off the remaining suspending fluid through the mesh and the deposited layer of fibrous material is then passed under a series of dryers to complete and dry the sheet.

U.S. Pat. No. 1,623,096 to Davies, dated Apr. 5, 1927, relates to a slice for a paper machine which is adjustable so that it can vary the depth of stock on the belt. The slice is located in close proximity to the head box. In addition, in order to prevent foam formed on the feed stock from carrying along onto the wire and marring the formation of the sheets, a flexible strip formed of a fabric material supported by means of a bar is positioned in front of the slice near the head box. This flexible strip drags on the surface of the feed stock. Other patents which disclose the use of a slice or a plurality of slices, in close proximity to the head box, include U.S. Pats. Nos. 1,564,728 to Van Ornum, dated Dec. 8, 1925; 1,662,226 to Witham, dated Mar. 13, 1928; 1,818,681 to Berry, dated Aug. 11, 1931, and 2,027,611 to Niks, dated Jan. 14, 1936.

U.S. Pat. No. 1,902,798 to Cape, dated Mar. 21, 1933, relates to a paper making apparatus wherein a first adjustable slice is employed in close proximity to the head box and breast roll, and a second adjustable slice is employed spaced apart from the first slice. The slices are used to correct irregularities in flow of the feed stock, such as ordinarily result in the formation of a web of nonuniform fiber density or variable thickness.

Each of the above patents uses a slice or slices in close proximity to the head box. Thus, the feed slurry of fibrous material on the wire mesh belt initially is brought to a layer of uniform depth. However, if the slurry includes undispersed flocs of fibrous material, it is nonuniform in composition, and if the slurrying fluid is drained through the support, the flocs are deposited in the layer, and produce nonuniformities in thickness and density in the layer, which show up as light spots. If the sheet, for example, paper, is held up to a source of light, these spots or irregularities can be observed as lighter areas. Such irregularities lead to nonuniform porosity and nonuniform pore size, which are undesirable in a filter, and especially a microporous filter.

The permeability of a filter to fluids is a function of pore size and percent voids volume. The higher the percent voids volume, at a given pore size and filter thickness, the larger the flow rate, i.e., the volume of fluid, that can be filtered per unit area and time. In the case of filters having an average pore size of more than 25 microns, a filter medium with as low as 20% voids volume may have adequate permeability. However, in the case of microporous filters, having an average pore size of 25 microns or less, a greatly increased resistance to flow is created as a result of the very small pore size, so that it is essential to have as high a voids volume as possible. For example, a microporous filter having an average pore size of about 1 micron and a voids volume under about 50% is essentially unsatisfactory for many applications since the flow rate will be too slow to be practical. For most applications, microporous filters have been found to require a voids volume in excess of 75% and frequently in excess of 85%.

Thus, a useful microporous filter should have the following attributes:

(1) It should have a microporous structure in which no pore is larger than about 25 microns.

(2) The microporous structure should have a high voids volume, preferably a voids volume of at least 75%.

(3) The product should have a high resistance to compression and back pressure.

(4) The product should withstand as high a temperature as possible. Useful strength at 275° F. is very desirable to permit steam sterilization or hydraulic fluid filtration, both commonly accomplished at this temperature. Useful strength at 400° F. is needed for sterilization by and filtration of hot air.

(5) The product should be insoluble in common chemical solvents and reagents, such as alcohol, acetone, dilute acids, etc.

(6) The product should be as rigid as possible.

(7) The microporous structure should be dimensionally stable, i.e. the pores should not change in size with use.

The latter criterion is quite important since a major application of the microporous filters is in the filtration of microorganisms from fluids. Accordingly, when such sterile microporous filters are in use, a very high concentration of microorganisms exists at the microporous surface. Consequently, any instability of the filter and resultant increase in pore size during use could lead to disastrous consequences.

In this specification and in the claims appended hereto, the terms "pore diameter," or "pore size," whether it be maximum pore diameter or size, or average pore diameter or size, is not intended to be a specific physical measurement but rather is a value calculated from the bubble point data as will be hereinafter described.

In copending application Ser. No. 98,595, filed Mar. 27, 1961, now U.S. Pat. No. 3,238,056, dated Mar. 1, 1966, a method is provided for impregnating or coating or both impregnating and coating a preformed porous substrate with a particulate material in order to yield a microporous product. It has been found that under certain process conditions, coating the porous substrate rather than impregnating it yields a product having a greater permeability to fluids. The microporous coating formed has a very high voids volume, and a very small maximum pore size. The coating tightly adheres to the porous base and hence is stable in use. The microporous medium has sufficient strength and rigidity to withstand normal handling techniques.

In copending application Ser. No. 215,151, filed Aug. 6, 1962, now U.S. Pat. No. 3,246,767, a method is proposed for coating a preformed porous base or substrate with a particulate material in order to lay down a microporous layer on the substrate, which layer has a high voids volume, generally at least about 75%, a maximum pore diameter less than about 10 microns, and a proportion of fibers extending outwardly from the base or substrate at an angle greater than about 30°, and which layer is adhered to the substrate by means of a binding agent. The microporous layer tightly adheres to the porous substrate, and hence is stable in use.

In copending application Ser. No. 530,735, filed Feb. 28, 1966, now U.S. Pat. No. 3,353,682, a process is provided for manufacturing microporous materials having two layers or zones integrally connected, a first layer which is in effect a substrate but which is formed in situ and is finer in pore diameter than the second layer, which is coarser in pore diameter and is built up on the first layer and locked thereto by intermingled fibers brought together and intertwined during laydown of the first and second layers. The resulting microporous materials are composed of fine and coarse layers integrally associated and bonded together. Unlike the materials of Ser. Nos. 98,595 and 215,151, the substrate or base layer is the finer layer, and the layer built up thereon has a greater thickness than the substrate layer. It thus can take on some of the characteristics of a depth filter.

The process of Ser. No. 530,735 comprises flowing upon a foraminous support a dispersion in a dispersing liquid of fibrous material, and optionally a binding agent, forming a plurality of clumped masses of fibers together with a proportion of separate fibers in the dispersion, forming on the foraminous support a thin first microporous layer of the separate fibrous material having fibers lying almost entirely in planes approximately parallel to the plane of the layer, and having a maximum pore diameter of less than 25 microns, by flowing through the support not over 20% of the dispersing liquid, at a pressure differential of less than 12 inches of water, depositing the fibers upon the support to form the thin layer and then flowing the supernatant liquid through the thin layer by gravity draining, or by applying a direct pressure to it, or by applying a vacuum to the underside of the foraminous support, and depositing the remaining fibrous material of the dispersion including the clumps on the thin layer, to form thereon a fluid-permeable layer wherein a proportion of fibers extend in a direction outwardly from the thin layer at an angle greater than about 30°, sufficient to impart to the layer an average pore diameter below about 150 microns and a voids volume of at least 75%.

The microporous material can then be stripped from the support, or the support can be allowed to remain for greater strength, or for fabricating special types of structures.

The process of Ser. No. 530,735 makes possible the production of microporous bilayered fibrous material in the form of mats, bats or sheets of any desired thickness comprising an integrated layered structure having a fine fibrous layer characterized by having fibers lying almost entirely in planes approximately parallel to the plane of the layer, and having ultrafine micropores less than about 25 microns and preferably less than 10 microns in diameter, and a low voids volume, and having a coarser fibrous layer of high voids volume and having pores generally averaging up to about 150 microns in diameter, but preferably not in excess of about 70 microns in diameter, and which can also be made to have rather fine pores, none of which exceeds 25 microns in diameter. The relatively coarse layer is characterized by having a proportion of fibers extending outwardly from the fine layer at an angle greater than about 30°, and by a wide spacing of fibers in the layer, which is responsible for the high voids volume, as compared to the fine layer. The voids volume of his relatively coarse layer preferably exceeds about 75% and is frequently greater than 85%.

The fiber spacing and angular disposition of the fibers in the coarse layer is noted by cross-sectional examination, upon sufficient magnification through an optical or electron microscope. This unique property of the relatively coarse layer is in large measure responsible for the combination of high voids volume and low pore size characteristic of the products of that invention, whereas the thin layer has a low voids volume and an even lower pore size because the fibers are approximately in the same plane.

STATEMENT OF THE INVENTION

In accordance with this invention, process and apparatus are provided for manufacturing microporous materials having three or more strata per layer and one or more layers, each layer separately prepared and bonded or laminated together, of which at least one layer is microporous, and has a pore diameter of less than $25\mu$.

The process of this invention comprises flowing upon a foraminous support a slowly flocculating dispersion in a dispersing liquid of fibrous material, composed of both long and short fibers which may also be of different diameters and preferably having an average length:diameter ratio of from 50:1 to 5000:1 and a diameter within the range from 0.01 to $10\mu$, and optionally nonfibrous particulate material, and a binding agent; forming a supernatant layer of the suspension on the support, with at least a proportion of separate fibers; depositing on the foraminous support a thin base stratum of predominantly separate fibrous material having long and short fibers lying almost entirely in planes approximately parallel to the plane of the layer; and then depositing thereon a thin microporous stratum composed of predominantly short deflocculated fibers, also lying almost entirely in planes approximately parallel to the plane of the layer, and having a maximum pore diameter of less than $25\mu$, by flowing through the support not over 20% of the dispersing liquid, at a pressure differential of less than 12 inches of water, while breaking up any large clumps of fibers that may form; and then flowing the remaining supernatant liquid of the dispersion through the two thin strata by gravity draining, or by applying a direct pressure to it, or by applying a vacuum to the underside of the foraminous support, and depositing the remaining flocculated fibrous material of the dispersion on the thin strata, with a proportion of the fibers in the added third stratum oriented so as to extend in a direction across the plane of the layer at an angle thereto greater than about 30°, sufficient to space the fibers in the third stratum at an average pore diameter below about $25\mu$ and a voids volume of at least 75%.

The microporous material can then be stripped from the support, or the support can be allowed to remain, as a substrate, for greater strength, or for fabricating special types of structures.

The process makes possible the production of microporous mono- and multilayered fibrous material in the form of mats, bats or sheets of any desired thickness, comprising a microporous layer having a base fibrous stratum composed of mixed relatively long and relatively short fibers, an intermediate fine fibrous stratum composed of relatively short fibers and having ultrafine micropores, less than about $25\mu$ and preferably less than $10\mu$ in diameter, both the base and intermediate strata having a major proportion of fibers lying almost entirely in planes approximately parallel to the plane of the layer, and a top coarse stratum having a proportion of fibers oriented at 30° across the plane of the layer, so as to have a high voids volume, in excess of 75%, thus obtaining in three separate strata, with complete control of characteristics of each stratum, the features of the two integrated layers in the product of Ser. No. 530,735.

The fiber spacing and angular orientation of the fibers in each stratum with respect to the plane of the microporous layer is noted by cross-sectional examination, upon sufficient magnification through an optical or electron microscope. The properties of each stratum of the microporous layer of the invention can be controlled to give any desired high voids volume and low pore size, characteristic of the products of this invention.

Where the microporous material of the invention is employed to remove bacteria and other microorganisms from a fluid, the microporous layer should have a pore diameter within the range from about 0.03 to about $0.8\mu$.

Filter units and elements comprising the microporous material of this invention are capable of absolutely removing from fluid particles as small as $25\mu$ in size and even particles of from $10\mu$ down to $0.03\mu$ and smaller. At the same time, a relatively deep layer can be provided, that protracts the life of the microporous filter by serving as a type of depth filter, providing a high voids volume for retention of particles.

The process of the invention also attacks the problem of uniformity in laydown, referred to heretofore in the discussion of the manufacture of paper, by ensuring uniform distribution of flocculated and deflocculated fibrous material in the suspension thereof prior to laydown on the screen. This is done by preventing deposition of large flocs, before they can be laid down. The slurry is deflocculated at the time of the initial gravity laydown of the separate fibrous material on the substrate, or wire screen, and thereafter the distribution of fibrous material in the slurry, which is slowly flocculating, is maintained substantially uniform prior to final laydown. In this way, the final microporous layer produced has a substantially uniform thickness and density, and is substantially free of light spots.

By "slowly flocculating," it is intended that the slurry should flocculate more than 80% of its fibers within the time required to form the initial stratum of fibrous material on the substrate or support. Usually, dependent of course on the speed of operation of the apparatus, this will require from about ten seconds to about two minutes.

In accordance with the instant invention, therefore, process and apparatus are provided for forming from a slurry of fibrous and optionally also nonfibrous, particulate material, of different lengths and optionally different diameters, a microporous material having three distinct strata and which is substantially uniform in thickness, porosity, and density, and substantially free of light spots. The invention provides a process of forming sheet material from a slurry of fibrous and optionally also nonfibrous particulate material which comprises flowing the slurry on a foraminous support, establishing a relatively quiescent zone at a predetermined fluid depth or head of fluid pressure favoring gravity drainage of a proportion of slurrying fluid; and then while the slurry is deflocculated, allowing a portion of the slurrying fluid in such zone to gravity drain through the support and form a base stratum on the support of a portion of the suspended material; allowing the slurry to flocculate and then allowing a further portion of the fluid to gravity drain through the support, and form an intermediate stratum of deflocculated fibers on the support; passing the remaining supernatant slurry on the support through a narrow gap substantially narrower than the depth of slurry on the support, to break up larger nonuniform flocs of suspended material and uniformly distribute such material therein; and drawing off remaining supernatent slurrying fluid through the support while the flocculated slurry is still substantially uniform and free from large flocs, thereby forming a third stratum on the intermediate stratum. The layer formed from the suspended material is dried, and stripped from the support. The final product is a sheet material which is substantially uniform in thickness and density, and substantially free of light spots.

The invention also provides porous sheet material especially useful as microporous filter material and prepared by such process and/or apparatus. The product can have one or a plurality of three-strata layers, and such layers can be self-supporting, or supported on a substrate to which the layer is adherent. The three-strata layers can be combined in multilayered laminates or composites, of which at least one layer and preferably each layer is prepared by the process and/or apparatus of the invention, and the strata and the layers can be the same or different, to obtain different filtration effects in each layer or stratum.

Such porous sheet material is characterized by a pore diameter of less than $25\mu$, and preferably less than $10\mu$, and a voids volume in excess of 75%. The high voids volume for this extremely low microporous pore size is obtained by selection of the particulate material of which the material is composed. The particulate material must comprise fibrous material in an amount of at least 5% and preferably at least 15% up to 100%, and optionally nonfibrous particulate material in an amount from 0% up to 85%, and preferably not over 85%. The fibrous material has a ratio of length:diameter of from 50:1 to 5000:1 and preferably 100:1 to 1500:1, and a diameter within the range from 0.01 to $10\mu$. Nonfibrous particulate material employed in admixture with or distributed in fibrous material has a diameter not less than one-half nor more than twice the diameter of the fibrous material.

The laydown of the particulate material from the slurry is carefully controlled in the process and apparatus of the invention to the desired characteristics in each of the three strata. It is necessary to avoid deposition of large heterogeneously dispersed flocs or clumps of particulate material on the base or support, since nonuniformity can result. The deposition of separate deflocculated fibers or other particulate material in the first two strata and of uniformly distributed small flocs or clumps is the desideratum, and this is achieved by disruption of the large flocs throughout the deposition, before they can be deposited. It is also necessary to lay down separate deflocculated long fibers or other particulate material from a deflocculated slurry in forming the initial stratum of the layer by flow through the support under a very low head of pressure, to lay down separate deflocculated short fibers or other particulate material from a flocculated slurry in forming the intermediate layer, and to lay down flocculated clumps of fibers or other particulate material from a flocculated slurry in forming the third or top layer. All of the fibers or other particulate material in the slurry may not be flocculated, and some can and probably will be separate, but at least 80% of the fibers of other particulate material are flocculated during this third deposition stage.

The long fibers or other particulate material are laid down in the initial stratum to block the openings or pores in the substrate, and form a base for laydown of the next stratum. The pores in the initial stratum may be larger than $25\mu$, but this is unimportant. The pores in the next or intermediate stratum determine the maximum pore size of the layer.

The laydown of the short fibers or other particulate material in the intermediate layer is achieved by flocculating the slurry, which holds the longer fibers or other particulate material in suspension in the form of clumps, so that principally the short deflocculated fibers or other particulate material separate out. By control of the length and diameter of these fibers or other particulate material, as well as their proportion in the slurry, the characteristics of the stratum are controlled to meet any requirements. Mixed fibers and other particulate material can also be used.

These two strata are laid down under low pressure, such as by gravity drainage, at a pressure differential of less than 12 inches of water. The remainder of the slurried particulate material is laid down under higher pressure, if desired, from a flocculated slurry, mostly as clumps or flocs with the cross fibers already oriented at an angle of 30° or more. The initial strata probably diminish the effect of suction applied from below or pressure applied from above, so that the remaining material is not sucked down with the available force. Due to the flocculated condition of the dispersion, and the slower laydown under low pressure or force, the cross fibers are oriented at an angle of 30° or more across this stratum, and are primarily responsible for the spacing of the particulate material in the stratum. The top stratum thus is well spaced and coarse, and provides a high dirt capacity prior to the intermediate stratum.

Thus it is, that in the zone of gravity drainage, the separate, finer, discrete, deflocculated particles including an insufficient proportion of flocs of particulate material to deleteriously affect uniformity, settle out on the support to form strata of relatively fine pore size, while the major proportion of flocs and or clumps remain suspended in the supernatant slurry atop the initial layer of particulate material, and are deposited later with the proper orientation, due to flocculation, to give a stratum of relatively coarse pore size.

The apparatus in accordance with the invention comprises a foraminous support; means for delivering slurried particulate material to the support; means for retaining the slurry on the support so that slurrying fluid drainage is through the support; barrier means disposed across the support and defining a narrow gap therebetween through which the particulate material layer and supernatant slurry on the support must pass, to establish a relatively quiescent zone at a predetermined head of pressure before the barrier for gravity drainage of fluid through the support, and beyond the barrier, to reduce the depth of the layer of slurried particulate material on the support and ensure uniform distribution of particles therein by breaking up large flocs therein by fluid flow as they are forced to pass through the gap; and means for drawing the fluid of the flocculated slurry through the support beyond the barrier, for final laydown of the particulate material, by application of a differential pressure across the support, before large flocs can form again in the slurry.

The apparatus of the invention can be advantageously modified by including at least one auxiliary barrier means, and preferably a plurality of spaced auxiliary barrier means, disposed across the support and supplementing the first or primary barrier means and the means for delivering slurried particulate material to the support. The auxiliary barrier or barriers define gaps above the support substantially larger or smaller than the gap between the primary barrier and the support, through which the slurry containing particulate material delivered to the support must pass, and are needed before or after the primary barrier whenever the slurry is slow draining, to prevent formation and deposition of sufficiently large flocs to cause a change in weight of thickness of the stratum where they would be deposited. The large flocs in the slurry of particulate material are broken up by fluid flow, as they are forced to pass through the gaps. Small flocs are not affected. Such a barrier can eliminate large flocs in a slurry that is settling by gravity. The auxiliary barriers to be employed can be from one to six, or more, depending upon the length and rate of advance of the drainage area.

In a preferred variation of the apparatus of the invention, the foraminous support comprises an endless wire mesh belt running over a plurality of rollers, and the apparatus includes a head box for delivering slurried particulate material to the support, means for retaining a predetermined depth of slurry on the belt, so that the fluid passes through the belt, a vacuum box or suction means for drawing the fluid content of the slurry through the support; a primary barrier means such as a primary deflocculating doctor blade, disposed between the vacuum box and head box at a position at least ⅗ the distance from the head box, and disposed across the wire mesh belt, inclined in the direction of fluid flow at an angle to the belt within the range from about 30 to about 45°, with a narrow gap between it and the belt (or a substrate support, such as paper, if one is used), at the minimum width permitting free flow of particulate material thereunder without blockage or obstruction due to particulate material build up at the head box of the deflocculating blade while retaining a predetermined head of slurry before it on the support, and a plurality of auxiliary deflocculating blades disposed between the primary deflocculating blade and the head box and across the wire mesh belt, inclined in the direction of fluid flow at an angle to the belt within the range from about 30 to about 45°, with a narrow gap between the auxiliary deflocculating blades and the belt (or other substrate). This gap is about 3 to about 30 times, and preferably from about 5 to about 10 times, larger than the gap between the primary deflocculating blade and the support. The position of the auxiliary deflocculating blades and the gap between the auxiliary deflocculating blades and the support are adjusted to ensure that the level of liquid is substantially constant across the support and that there will not be an appreciable pressure drop across the support.

The gap between the primary deflocculating blade and the support usually will be from about one to about five times and preferably from two to four times the thickness of the final sheet desired, so as to reduce the thickness of the feed stock moving on the wire mesh belt toward the vacuum box to within the range from about 0.010 to about 0.3 inch, and break up large flocs in the feed stock by the shear force created by the turbulent flow of fluid through the gap before the feed stock reaches the vacuum box or suction means. In addition, the deflocculating blades help build up a head of liquid pressure on the support between them and the head box, and thus promote more rapid gravity drainage, and permit formation of the first two strata on the support.

The gap between the edge of the primary deflocculating blade and the surface of the support, such as the wire mesh belt or substrate, should be wide enough to clear the initial stratum of particulate material and permit slurry supernatant thereon to pass beneath the blade, and wide enough to prevent a dam-up of particles and/or fibers at the blade, while retaining a desired depth of slurry on the support. The angle at which the deflocculating blades are disposed to the support should be adjusted in a manner such that the particles collecting at the blades can be drawn through the gap as they travel on the moving support.

The actual gap employed between the edge of the primary deflocculating blade and the support will depend on the type and size of particle employed. Thus, for example, where employing crocidolite type asbestos of 0.5 to 1.5 microns in diameter and about 300 microns in length, the gap can be within the range from about 0.025 to about 0.045 in. If glass fibers of 0.5 to 1.5 microns in diameter and 500 to 1500 microns in length are employed, the gap can be within the range from about 0.050 to 0.080 in. However, when the diameter of the glass fibers is increased to 1.5 to 4 microns, the gap employed should be increased to about 0.080 to 0.120 in., and when the diameter is increased to 4 to 8 microns, the gap should be increased to 0.120 to 0.160 in. If polyester fibers of 15 microns in diameter and 0.25 in. in length are employed, a gap of only 0.080 to 0.120 in. can be employed. If cellulose fibers are employed having a diameter of 8 to 25 microns and a length of 0.125 to 0.5 in., the gap can be 0.160 to 0.240 in. In most cases, the gap is set by trial and error, at the minimum permitted for the thickness of sheet desired through which the particulate material will flow without build-up or damming.

If a plurality of auxiliary deflocculating blades are employed, they are normally spaced at least two inches from each other and from the primary deflocculating blade, the initial auxiliary deflocculating blade being positioned at the beginning of the support. The auxiliary deflocculating blades are particularly useful where the slurry of particulate material is a slow draining slurry and the flocs present in the slurry tend to settle out by gravity, for example, where the slurry has a drainage rate of less than about 2 gal./ft.$^2$/min.

The apparatus, process and product of the invention are well illustrated in the accompanying drawings.

This figure represents a multilayer product produced in accordance with Example 7, and a detailed description thereof will be found in that example.

The invention is of particular application to the preparation of microporous materials formed in pleats, convolutions, or corrugations. In such cases, the microporous material, with or without a support, and in one or several layers, can be corrugated, convoluted or pleated using conventional methods. Also, the porous base on which microporous material is built up can be formed in pleats, convolutions or corrugations, and the microporous layer can by this process be laid on the corrugated base, without bridging between adjacent pleats, convolutions or corrugations, and no shrinkage of the microporous layers occurs in use.

FORMATION OF THE DISPERSION

In the process of the invention, as indicated, fibrous material is dispersed in a liquid and deposited therefrom upon the surface of a foraminous support base. The desired degree of microporosity of the deposited intermediate stratum is obtained by varying the type, size and amount of the fibers deposited in that stratum, by employing blends of different sizes of fibers, if desired.

The product of the invention can be formed of fibrous material of any type, the only requirement being that the material be capable of being dispersed in a liquid and have a diameter of less than 25 microns and preferably have a diameter from about 0.01 to to about 10 microns, and a length from 1 to preferably not exceeding about 50,000 microns. The ratio of length:diameter is from about 50:1 to about 5000:1, and preferably from about 350:1 to 1500:1.

In the formation of the intermediate and top strata of different porosity, it is of course essential to deposit fibers of different lengths and desirably different diameters and even different types in these strata. The fibers of least diameter give the smallest pores, and the length of the fibers determines ease of clumping, so as to hold up the fibers of the top stratum until the fibers forming the intermediate layer have settled out. Desirably, the length-diameter ratio of fibers for the intermediate stratum should be from about 50:1 to about 500:1, and the fibers for the top stratum should have a ratio from about 500:1 to about 5000:1.

The diameter of the former can be the same as the diameter of the latter, but usually, if a mixture of fibers is used, the shortest and finest will settle out first, because the shortest and finest fibers are the last to become flocculated. In general, the fibers for the intermediate stratum will have a diameter that is approximately ⅓ of the pore size desired in that stratum, at the stated length:diameter ratio.

The length of fibers for the base stratum is determined by the minimum length that is retained on the support, and is ascertained by trial and error for the particular support used.

Fibrous material is preferred as the particulate material, because of its versatility, greater ease of deposition, and greater strength-imparting properties, and because fibers can be oriented by liquid flow or absence of liquid flow so as to be deposited in a plane approximately parallel to the plane of the layer. A great variety of diameters of fibers are available, thus making it possible to achieve a very large assortment of mixtures of different diameter fibers, for making fibrous material of any porosity, and such fibers can be made of any length, within the stated range, so as to take advantage of the greater cohesiveness of a layer of long fibers, as compared to granular material layers. Typical fibrous materials include glass and quartz, ceramics, asbestos, potassium titanate, collodial aluminum oxide ("Baymal"), aluminum silicate, silicon carbide whiskers, mineral wool, regenerated cellulose, microcrystalline cellulose, polystyrene, polyvinyl chloride, polyvinylidene chloride, polyacrylonitrile, polyethylene, polypropylene, rubber, polymers of terephthalic acid and ethylene glycol, polyamides, casein fibers, zein fibers, cellulose acetate, viscose rayon, hemp, jute, linen, cotton, silk, wool, mohair, paper, metallic fibers such as iron, copper, aluminum, stainless steel, brass, Monel, silver and titanium, and clays with acicular latch-like or needle-like particles, such as the montmorillonite, sepiolite, palygorskite, and attapulgite clays of this type.

The layers can be advantageously modified by employing a mixture of long and short fibers. The long fibers can be of an average length not less than the average pore size of the foramina of the support or mesh screen, and form the first thin stratum thereon. Thereafter, a substantially uniform intermediate stratum of short fibers can be laid down on the first stratum, and then finally a mixture of clumped and separate long and short fibers as the top stratum. Such a mixture of fibrous material should comprise from about ½ to about 30%, and preferably from about 2 to about 15%, by weight of long fibers having an average length as great as the average pore size of the foramina of the coarse support substrate or mesh screen. The diameter of the long fibers should be less than about 10 times the diameter of the small fibers which comprise the rest of the mixture, and should preferably be less than about 3 times the diameter of the small fibers. Employment of more than 30% by weight of long fibers in the fibrous material mixture affords no significant advantages, but will only provide a coarser filter medium.

The fibrous material employed in the mixture of various size fibers, if it is too long, or agglomerated, can be broken down into such a length that the desired pore size can be formed. Thus, for example, if the fibers are supplied in bundles which are not readily dispersible in water, the bundles should be broken up by a high shearing action or by grinding, so that the ratio of the length of the fiber to the diameter of the fibers is within the range from about 50:1 to 5000:1, and preferably within the range from about 350:1 to about 1500:1. Such fibers can be broken up with the use of conventional mechanical equipment, such as high speed propellers, grinding equipment, and beaters, such as the Holland and Jordan beaters. Thus, for example, if bundles of asbestos are to be used as fibrous filter material, the bundles can be broken down by the use of Holland or Jordan beaters, or by ball milling in a nonionic detergent-water solution to break down and separate the fibers from one another. Over-sized asbestos can be removed from such a mixture by the use of liquid cyclones, such as hydroclones, which collect the desired short fiber material, free of the oversized material. Where asbestos is employed, the use of high speed propellers to generate high shearing action has been found to be inadequate to break up the bundles of fibers. However, where asbestos is used as the long fiber containing material, grinding or shearing action, such as in a Cowles dissolver, can be employed since a small number of fibers having a diameter to length greater than 5000 can be tolerated.

A mixture of long and short fiber-containing filter material is also employed in the filter material, where special properties are to be imparted to the filter medium, such as, for example, good dirt capacity, good flow-through, and high filtering power, good mechanical strength, and the like.

Nonfibrous particulate materials can be used in admixture with fibrous materials. However, in order to achieve the requisite microporosity and voids volume, it is essential to employ at least 5 parts by weight of fibrous material for every 95 parts of nonfibrous materials. When nonfibrous particles are employed, they should have an average diameter not exceeding 25 microns, and preferably not less than one-half the diameter of the fibers.

Those nonfibrous materials containing a fine internal structure or porosity are preferred, for maximum voids volume. Porous diatomaceous earth is particularly useful, inasmuch as each particle acts as a small filter having pores of from 0.1 to 10μ. The collection of dirt in these pores does not result in filter clogging since the fluid can flow around the particles.

Nonporous particulate materials restrict fluid flow and reduce voids volume. However, they are useful if this detriment can be accepted. Adsorbent materials are especially useful. Particles intended to be leached by the fluid, such as pH control compounds and bactericides, increase voids volume concomitantly with lodging of contaminants in the filter pores.

Typical nonfibrous particulate materials are diatomaceous earth, magnesia, silica, talc, silica gel, alumina, quartz, carbon, activated carbon, clays, synthetic resins and cellulose derivatives, such as polyethylene, polyvinyl chloride, polystyrene, polypropylene, urea-formaldehyde, phenol-formaldehyde, polytetrafluoroethylene polytrifluorochloroethylene, polymers of terephthalic acid and ethylene glycol, polyacrylonitrile, ethyl cellulose, polyamides and cellulose acetate-propionate, and metal particles such as aluminum, silver, platinum, iron, copper, nickel, chromium and titanium and metal alloys of all kinds, such as Monel, brass, stainless steel, bronze, Inconel, cupronickel, Hastelloy, beryllium, and copper.

Nonfibrous particulate materials small enough to pass right through the pores of the support or lower strata during deposition are prevented from doing so by the presence of fibrous material in the depositing slurry. The useful range, depending on the particle size, is from 1% of $0.1\mu$ average fibers to 80% of $3\mu$ average fibers.

The liquid medium used for the dispersion is preferably inert to the fibrous material, and a nonsolvent for any binder that is used. It should not dissolve a substantial amount of either, although if the liquid is reused, the fact that some material is in solution is not a disadvantage, since a saturated solution is quickly formed ab initio. The liquid should be volatile at a reasonably elevated temperature below the melting point of the material to facilitate removal after the dispersion is deposited. However, nonvolatile liquids may be desirable under certain conditions, and those can be removed, by washing out with a volatile solvent that is a solvent for the liquid but not for the fibrous material. The liquid can be the liquid to be filtered by the final product.

Typical liquids are water, alcohols, polyalkylene glycols, such as polyethylene glycols, poly 1,2-propylene glycols, and mono and dialkyl ethers thereof, such as the methyl, ethyl, butyl and propyl mono and diethers, dialkyl esters of aliphatic dicarboxylic acids, such as, di-2-ethyl-hexyl adipate and glutarate, mineral lubricating oils, hydraulic fluids, vegetable oils and hydrocarbon solvents such as xylene and petroleum ether, silicone fluids, chloro-, bromo-, and fluoro-hydrocarbons, such as the Freons. Since the final product is permeable to any liquid, depending upon the choice of fibrous material, obviously a wide selection of liquids is available, and such would be known to one skilled in this art.

The characteristics of the deposited layer desired are determined by control of several variables.

One factor is the size of the fibrous material. This can be so chosen as to be larger than, equal to, or smaller than the pore diameter.

The percent of fibers flocculated in the slurry is important with respect to the voids volume, uniformity, and adhesive characteristics of each stratum. The characteristics of the strata are determined by the proportion of the separate fibers that are deflocculated and deposited in a plane parallel to the layer in the first two strata, and by the proportion of the flocculated clumped fibers that include the cross fibers in the top stratum. It is believed that when the degree of flocculation is within the stated range (i.e. at least 80% of the fibers present are flocculated), any large clumps which form in the dispersion are relatively nongravity settling, and are broken up by the deflocculating blades before they can settle out. The individual fibers and the small uniform clumps are deposited on the support by controlled deposition, and build up the strata of the layer thereon. The extent of the need for flocculating and deflocculating agents (which are not required if the dispersion is sufficiently flocculating without them), for pH control, and for controlled agitation, to achieve the optimum state of flocculation for each fibrous material, must be determined experimentally, and is interdependent with the rate of deposition. To obtain control of flocculation, flocculating and deflocculating agents are added to the dispersion and the state of agitation and the pH of the dispersion are varied, using the test described herein to evaluate the flocculating characteristics of the resulting slurry.

It may be advantageous to use a blend of small and large fibers to assist in establishing interlocking between the fibers and the support. It is essential that the fibers of the layer be held securely to one another by interlocking and not be easily dislodged by reverse pressure or mechanical abrasion subsequent to application.

In order to obtain strong adhesion between the fibers, where the product is desired to withstand reverse flow, and mechanical abrasion, the dispersion of fibrous materials can include a binding agent or heat- or solvent-sensitive fibers or particulate material. Alternatively, if desired, or in addition, a binding agent can be impregnated into the microporous material after it has been formed. Then the binder or heat-, or solvent-sensitive material is activated to bind the fibers together.

The fibrous and/or nonfibrous particulate materials in the dispersion should be capable of being wetted by the binding agent employed and of remaining wetted thereby even in the presence of the dispersing liquid. This latter requirement can be generally insured by premixing the binding agent and the fibrous material before adding them to the dispersing liquid.

The binding agent employed in the instant invention can be a liquid, or a solid capable of being softened or liquefied at the time adhesion is to be effected, and if a liquid, thereafter must be capable of undergoing solidification, as by polymerization, cross-linking, evaporation of a solvent, cooling, or the like. Liquid thermosetting resins are particularly advantageous, since they are effective in low concentrations and can be maintained in liquid form until it is desired to cause them to solidify. Representative liquid thermosetting resins include phenol-formaldehyde resins, urea-formaldehyde resins, melamine-formaldehyde resins, polyester resins and polyepoxide resins.

The liquid polyepoxide resins are particularly preferred. The polyepoxides that can be used in this invention can be saturated or unsaturated, aliphatic, cycloaliphatic, aromatic or heterocyclic, and may be substituted if desired with substituents, such as chlorine atoms, hydroxyl groups, ether radicals, and the like. They may also be monomeric or polymeric.

Also applicable as binding agents for use in this invention are solutions of solid thermosetting resins in suitable solvents.

Thermoplastic solid binders can also be employed as long as they can be softened to a tacky state, or liquefied, as by heating to above their softening point, to effect adhesion. Such thermoplastic materials can be employed alone or in solution in a suitable solvent. Typical thermoplastic binders include polyethylene, polypropylene, polymethylene, polybutylene, polyisobutylene, polyamides, cellulose acetate, ethyl cellulose, copolymers of vinyl chloride and vinyl acetate, polyvinyl chloride, polyvinylidene chloride, polyvinyldene fluoride, polyvinyl butyral, polytetrafluoroethylene, polytrifluorochloroethylene, lignin-sulfonate resins, starch binders, casein binders, and terpene resins, polyacrylic resins such as polymethyl methacrylate, and alkyd resins.

In addition, there can be used elastomeric binders such as a natural or synthetic rubber. A preferred synthetic rubber which can be employed is neoprene which is a polymer of 2-chloro-butadiene-1,3, generally referred to as polychloroprene. These can be used in the practice of this invention in the form of the conventional latices of polymers of chloroprene. These are prepared by polymerization of chloroprene in aqueous emulsion by well-known techniques, which are disclosed in numerous references, such as, for example, Whitby, "Synthetic Rubber," 1954, pages 767 to 793, and the following U.S. patents: 2,264,173; 2,417,034; 2,426,854; 2,463,225; 2,467,769; 2,494,087; 2,567,117; and 2,576,009. The solids content of the polychloroprene latices usually ranges from 30% to about 60%.

It is to be understood that the term "chloroprene polymer" is intended to include both homopolymers of chloroprenes and copolymers of chloroprene in which the copolymer contains another copolymerizable monomer containing the group Examples of suitable comonomers include: vinyl-substituted aromatic compounds such as styrene, vinyltoluenes, and vinylnaphthalenes; acrylic and methacrylic acid esters and nitriles, such as methacrylate and acrylonitrile, and compounds containing two conjugated double bonds such as 1,3-butadiene, isoprene, and 2,3-dichloro-1,3-butadiene.

Other synthetic rubbers useful herein include, for example, the products known as GR-S(SBR) which are copolymers of butadiene and styrene containing about 50% to about 70% by weight butadiene; the rubber designated as Buna N, or Hycar (NBR), which are copolymers of butadiene and acrylonitriles containing about 50% to about 80% by weight butadiene; the homopolymers of butadiene (BR) as well as the homopolymers and/or copolymers of butadiene homologues such as the isoprene rubbers (IR). These materials are generally designated as synthetic rubbers, and more specifically designated as rubber-like polymers of butadiene, isoprene and chloroprene, and rubber-like copolymers of butadiene or isoprene with copolymerizable vinyl compounds such as styrene and acrylonitrile. In addition, ethylene-propylene rubbers and polyurethanes can be employed.

In preparing the dispersion of fibrous material, the binding agent can be mixed with the fibrous material and the mixture then added to the dispersing liquid with agitation, to create a stable dispersion. When the fibrous material is prewetted with the binding agent in this manner, the droplet size of the final dispersion is coarser than when the fibrous material and the binding agent are added separately to the dispersing fluid. To stabilize this coarser dispersion, it is preferred that the dispersion have a viscosity in excess of about 400 centipoises at 25° C. If the particulate dispersing fluid does not have a sufficiently high viscosity to achieve this, the viscosity of the dispersion can be increased by the addition of any of the well known soluble high molecular weight materials which have the ability to substantially increase the viscosity of fluids even when present in very small quantities. Soluble cellulose derivatives are particularly useful when the dispersing liquid is water. The addition to water of less than 2% by weight of soluble, high molecular weight hydroxyethyl cellulose, soluble sodium carboxymethyl cellulose or soluble hydroxypropyl methyl cellulose, for example, has the effect of raising the viscosity of the water to well above the specified minimum even in the absence of the fibrous material and the binder.

An alternative method of preparing the dispersion which can be used to ensure that the fibrous material will be sufficiently wetted by the binding agent involves the use of a binding agent dissolved in a suitable solvent. The binding agent is insoluble in the dispersing liquid while the solvent is at least partially soluble therein. The fibrous material and the binding agent solution, which can be premixed if desired, either in whole or in part, are added to the dispersing liquid. The solvent dissolves wholly or partially in the dispersing liquid, causing the precipitation of the binding agent on the fibrous material.

The viscosity of the liquid dispersion can be sufficient to prevent more of the binding agent or fibrous material from settling out than is desired to form the fine or base layer of the microporous material.

The binding agent can also be used as an aqueous dispersion or latex, which is mixed with the aqueous fibrous dispersion. The binder then can be precipitated on the fibers by addition of a precipitating agent or coagulating agent.

For example, the elastomeric or other binder material also can be dispersed or dissolved in an organic solvent. Such a dispersion can be mixed with the dispersion of fibrous materials. The organic solvent should be partially miscible with the dispersing liquid for the fibrous material. The organic solvent should have a solubility in the dispersing liquid for the fibrous material of at least about 0.5 g. and not greater than about 15 g. per 100 g. of dispersing liquid, and preferably within the range from about 0.7 to about 8 g. per 100 g. If the organic solvent is more soluble in the dispersing liquid than this, the particles of binding agent dispersed in the organic solvent tend to precipitate from the solvent in the form of solid particles, and will not stick to the fibrous material. On the other hand, where an organic solvent is employed which is completely immiscible with the dispersing liquid for the fibrous material, an emulsion of the binder dispersion and the dispersion of the fibrous material will be formed, with the result that the elastomeric binder will not stick to the fibrous material. Moreover, where an organic solvent is employed which is partially miscible with the dispersing agent for the fibrous material as indicated above, when the binder dispersion is mixed with the dispersion of fibrous filter material, the binding agent will be in the form of a viscous gummy or tacky solid. The viscosity of the binder dispersion, however, should in no event be greater than 500 cp.

The dispersion should preferably contain from about 0.1 to 5 parts by weight of fibrous material per 100 parts by weight of dispersing liquid and, if a binder is present, from 1.5 to 2000 parts by weight of binding agent per 100 parts by weight of fibrous material, preferably at least about 10 parts of binding agent per 100 parts of fibrous material.

The pore size and voids volume of any microporous stratum is determined by the fiber length and diameter and the state of suspension of the fibers in the dispersion. The state of suspension required for forming a stratum of the desired pore size and voids volume for a given fiber or fiber mixture is determined by trial and error, and the parameters required to duplicate the successful experiment determined by a few simple measurements.

The state of suspension of the dispersion determined to be desirable is measured by the degree of flocculation thereof by titration with a solution capable of flocculating the dispersion such as magnesium sulfate or aluminum sulfate solution, for fiber dispersions having a pH above about 7, or sodium carbonate or sodium hydroxide solution for fiber dispersions having a pH below 7. The fiber dispersions in the test solution suitably can have a fiber concentration of 1 g./l. and the titrating solution a concentration of 5% of the active agent. The extent of flocculation effected by this flocculant is measured by observation of the turbidity of the dispersion, such as by a colorimeter, during the titration. A dispersion of this turbidity is then known to have the correct flocculating properties, or state of suspension, and succeeding dispersions can be made to this turbidity. Any desired flocculating property can be prepared by addition of the appropriate amount of dispersant or flocculating agent, to make the dispersion more or less flocculating, as the amount of titrating solution in the test may indicate, to give the required turbidity.

In order to make the dispersion less flocculating, a dispersing agent can be added to either or both of the dispersions although this is not essential. Any dispersing agent known to disperse the fibrous material used can be employed. These can be of the type used in the paper-making trade, such as the alkali metal polyphosphates, for example, sodium hexametaphosphate, sodium pyrophosphate, pentasodium tripolyphosphate, and sodium metaphosphate, and sodium metasilicate, as well as any synthetic surfactant or organic emulsifier, such as are described in Schwartz and Perry, "Surface Active Agents."

In order to make a dispersion more flocculating, a flocculating agent can be added. This can be of the type used in the paper-making trade.

Exemplary dispersing and flocculating conditions for several common fibers are as follows:

Potassium titanate, for example, does not always require a dispersing agent to form a sufficiently stable slurry in water, but a wetting agent may be required to obtain adhesion between certain fibers, such as glass, wool and synthetic resins.

From 0.001 to 5% of a wetting agent is usually sufficient. Anionic, nonionic and cationic wetting agents can be used.

LAYDOWN OF THE DISPERSION

Any method of applying the dispersion to the foraminous support in a manner to permit initial and intermediate strata formation by a draining of the supernatant

CONDITIONS

| Fiber | For dispersion | For flocculation |
|---|---|---|
| Amosite type amphibole asbestos | Add Tamol 850 (a water soluble sodium salt of polyacrylic acid) or a nonionic wetting agent. | Add an excess of sodium carbonate |
| Crocidolite type amphibole asbestos | Add Tamol 850 or a nonionic wetting agent | Do. |
| Chrysotile asbestos | Add Tamol 850 or sodium hexametaphosphate | Do. |
| Glass | Maintain pH at about 3 | Increase or decrease pH from 3. |
| Potassium titanate | Add a dispersing agent prepared by mixing 53.4 parts of mixed ammonium and ethanolamine salts of alkyl sulfuric acids derived by sulfation of the alcohols obtained by reducing coconut oil, 15 parts of the monoalkylolamide of coconut oil fatty acids and monoethanolamine, 2 parts of electrolyte (chloride and sulfate of monoethanolamine), 24 parts of ethanol and 5 parts of water. | No special conditions needed. |
| α-Cellulose wood pulp, Kraft pulp, Esparto. | Lignin sulfonates and sulfates / Polyoxyethylene-oxypropylene type surfactants | Aluminum salts. |
| Metal | Karaya gum / Carboxymethyl cellulose / Polyacrylate and polyacrylamide thickeners | Aluminum salts. / Hydrophobic wetting agents such as petroleum sulfonates. |
| Polyamides and polyesters | Polyoxyethyleneoxypropylene type surfactants | Aluminum salts. |

The flocculating agent can be added to the dispersion after the desired amount of material has been applied to the foraminous support during laydown of the initial stratum and intermediate stratum, to effect deposition of the remaining supernatant fibers. In a case of this type, it is preferred that the slurry be on the verge of instability and deposition, so that flocculation and deposition promptly follows blending with even small amounts of flocculating agent.

Some fibrous materials tend to flocculate others, due to, for example, a difference in charge on the fibers. For example, potassium titanate fibers are flocculants for asbestos fibers. Addition of the former to the latter therefore results in flocculation.

The amount and location of fibers deposited at any stage can be controlled by control of deposition through a varying of the size of fibrous material introduced, or by the amount of agitation applied to the slurry during deposition.

A dispersion which tends tends to flocculate too heavily in a quiescent suspension can be dispersed by agitation. The fibers are deflocculated during agitation but after agitation ceases, flocculation can recur. Thus, the characteristics of the strata laid down can be modified by agitation.

The amount of dispersing agent and flocculating agent, if used, should be selected with care, since if too much dispersant is used, the fibrous material will pass right through the foraminous layer, and clumping may be inhibited, whereas if too much of the flocculating agent is used, deflocculation is inhibited, and the fibrous material will not form a suitable thin layer. However, the relative amounts are readily determined by trial and error in each case, in relation to the fibers, their size, the temperature of deposition, the hardness of the water, and the solids content of the dispersion. Usually, from 0.001 to 5% of dispersant and from 0.001 to 5% of flocculant are satisfactory. These can be used separately as described, or together in the slurry in amounts to give a dispersion until deposition.

A wetting agent which wets the material can also be incorporated in the dispersion. If a dispersing agent is used, this should also serve as a wetting agent for the fibers and therefore should not only disperse the fibrous material but should also wet the fibrous material. If no dispersing agent is used, a wetting agent may be desirable.

liquid under a low head of pressure, less than 12 inches of water, through the layer and the support can be used. The dispersion can be flowed upon the support, such as a Fourdrinier wire mesh, or a porous smooth paper, or perforated metal band, if a smooth surfaced highly microporous material is desired, and deflocculated to form the initial fine layer. Some liquid passes through the support at this stage, and aids in forming the initial stratum by the liquid flow thus created. After formation of the initial stratum by drainage through the support of from 5% to 10% of the supernatant liquid of the dispersion, and of the intermediate stratum by drainage through the support of from 5% to 75% of the remaining supernatant liquid, both at a pressure differential of less than 12 inches of water, a higher differential pressure can be applied by applying a direct pressure to the dispersion from above, or by applying a vacuum to the underside of the support. The remainder of the dispersing liquid is thus drawn through the strata, and all of the fibrous material that is left is deposited thereon.

If the slurry of particulate material is a slow draining slurry, flocs present in the slurry in the quiescent zone may tend to settle out by gravity. If this occurs, the intermediate stratum that is formed there can contain enough flocs to disturb uniformity and may not have as fine a pore size as desired. In such a case, the pore size of the stratum of particulate material formed by gravity drainage can be reduced by breaking up a sufficient proportion of the flocs present in the slurry before they can settle out. This can be accomplished, in accordance with the invention, during gravity drainage by passing the slurry through at least one narrow gap that is less than the depth of the slurry on the support, and is substantially larger than the gap through which the supernatant slurry is passed after formation of the initial stratum by gravity laydown. A substantial proportion of the flocs are broken up, and the particulate material is thereby more or less uniformly distributed in the slurrying fluid. The strata of particulate material formed by gravity-laydown are thus substantially free of flocs, and are finer in pore size than if they contained flocs.

The gravity drainage time depends upon the rate of flow of liquid through the support, which in turn depends upon a number of factors, including the depth of the slurry on the foraminous support (i.e., the gravity head of fluid pressure on the support), the viscosity of the slurrying liquid, and the concentration, type and size of particulate material. Thus, for example, if the particulate material is a fibrous material which has a relatively small diameter, e.g. crocidolite asbestos, the rate of flow through the support is slower, and the gravity drainage time should be substantially more, than for a relatively large diameter straight and uniform fibrous material, such as polyester fiber. Usually, from about five second to about five minutes is sufficient.

By adjusting these variables, the rate of flow of liquid through the support is controlled in the quiescent zone during gravity drainage to form a substantially uniform initial stratum and then a substantially uniform intermediate stratum on the support. The deposition of the remainder of the flocculated particulate material in the slurry is then effected, uniformly, to form a third stratum in which a substantial proportion of fibers extends at an angle of at least 30° across the plane of the layer while the major proportion of the fibers is in planes approximately parallel to the plane of the layer. A proportion of fibers extends across the plane of this layer at an angle thereto greater than 30°, because they take this position in the dispersed clumps, and the fibers are exceptionally long, for their diameter, and are deposited under slight pressure, so they are not drawn down tightly against the support, as in the usual paper-making process. Hence, they tend to be joined at a wider spacing than they otherwise would, thereby contributing to the unusually high voids volume of the top stratum, even though the major proportion is in a plane approximately parallel to the plane of the layer.

The thickness or depth of the slurry of particulate material and initial laydown of particulate material on the support immediately prior to the final laydown of supernatant particulate material is reduced (by use of the deflocculating blade) to, and is maintained substantially uniform at, from about one to about five times, and preferably about two to about four times, the thickness of the finished sheet desired. For example, if 10% of the particulate material in the slurry is laid down by gravity to form initial and intermediate strata on the support, the total thickness or depth of the particulate material and slurrying liquid on the support is reduced to and is maintained at about the thickness of the finished sheet desired, whereas, where about 70% of the particulate material is allowed to gravity settle to form the initial and intermediate strata, the thickness of the particulate material and slurrying liquid can be reduced to and can be maintained at about five times the thickness of the final sheet desired.

Any porous material whose pores extend from surface to surface can be used as the foraminous support upon which the microporous strata are built up by deposition. The nature of the support will to some extent depend upon whether it is to be a part of the final microporous material, or whether it is to be stripped therefrom after formation. If it is to be a part of the material, one or several layers of the same or varying porosity can be employed. These can be composed of cellulose or other fibers. A smooth-surfaced material should be used if the support is to be stripped off, and a smooth fine layer is desired. Paper, which can, if desired, be resin impregnated, is a preferred base material since it yields an effective, versatile and inexpensive microporous fluid-permeable medium.

Where desired, other foraminous support material can be used, such as porous sintered powders or forms of metals and of natural or synthetic plastic materials, such as aluminum, and synthetic resins and cellulose derivatives, in the form of spongy layers of any desired thickness, such as polyurethane (see Pat. No. 2,961,710), polyvinyl chloride, polyethylene and polypropylene sponges and foams, woven wire products, sintered or unsintered, textile fabrics and woven and non-woven fibrous layers of all kinds, such as felts, mats and bats, made of fibrous materials of any of the types listed hereinbefore in connection with the fibrous material, for instance, nylon cloth. When it is to be a part of the microporous material, the foraminous support material will normally have an average pore diameter of not less than about 2.5 microns. Such material can of course have pores as large as 20 to 25 microns, or more. The pore size of the support is not critical, however, inasmuch as the microporous layer will normally have smaller pores, and will be responsible for the removal of the smallest particles. The support will serve a filtering function only if the flow is from that direction (reverse flow), and the microporous layer then assumes primary responsibility for removal of the smallest particles.

Where a Fourdrinier or similar traveling mesh belt type paper-making machine is employed in carrying out the process of the invention, modified as described herein to include deflocculating blades, operating within a reservoir disposed about the belt, the dispersion of fibrous material, binding agent, dispersing liquid and flocculating or deflocculating agents as needed, is deposited from the head box onto the continuously traveling mesh belt, and forms a quiescent body of dispersion on the support or substrate. At the time the dispersion is fed onto the support, it is partially deflocculated, due to the movement of the liquid, and the deflocculated separate fibers deposit at once on the belt (or substrate, if any, carried on the belt), to form an initial stratum having the desired thickness, set forth hereinbefore, and which is substantially free of flocs. This usually requires less than five seconds. Then, drainage slows, due to the interposition of the initial stratum, and the belt (or other support) enters the quiescent zone. Because turbulence in the dispersing liquid is low or nil in this zone, due to the restriction of drainage, the fibers can and do slowly flocculate, and can even form large clumps. However, the separate deflocculated fibers that do not enter into such clumps can and do continue to settle out, and form the intermediate stratum. This usually requires at least 15 second, and preferably at least 30 seconds.

The formation of large clumps large enough to cause a problem during this stage of the deposition is not desirable; and therefore the belt (or support) is passed under a doctor blade to partially defloccuate and break up such large flocs as may form in the supernatant dispersion. Then, the support can be passed over the vacuum or suction boxes, to draw the remainder of the dispersing liquid through the support, and there is thereby deposited the remainder of the suspended fibrous material in the form of flocks and any deflocculated fibrous material that may be present, completing formation of the top stratum of fibrous material on top of the initial thin and intermediate strata, to give a microporous layer which has the desired characteristics set out hereinbefore.

Thus, in summary:

(a) Acceleration of the rapid gravity drainage stage forming the initial stratum is achieved by increasing the depth of the slurry over the belt or support or Fourdrinier screen.

(b) A pool or reservoir of slurry is created above the Fourdrinier screen, in which flocculation can be controlled.

(c) The primary deflocculating blade acts as a partial deflocculator, and, therefore the slurry is normally made so as to be slowly flocculating, which makes it possible to obtain the cross fibers and high voids volume in the top stratum.

The fixed parameters are:

(1) Slurry freeness or drainage rate.
(2) Total weight of fibers per unit area.
(3) Substrate or support layer permeability.

The variables are:

(1) Machine speed.
(2) Slurry consistency percent by weight.
(3) Slurry viscosity.
(4) Rate of flocculation.
(5) Spacing and number of primary and secondary blades.
6) (An indirect variable) residence time or hold-up behind the primary blade.

It is possible that a slurry with just the right flocculation speed, drainage rate, etc. would drain through completely between the last secondary blade and the primary blade, so that the primary blade becomes ineffective. In this case, machine speed can be increased, with subsequent buildup of slurry-head behind the primary blade. Since such an ideal situation is rarely met in practice, however, objective (a) can always be attained or improved by increasing slurry depth on the belt. The general objective is to achieve a microporous layer which is as light and thin as possible for a given optimum dirt capacity and high voids volume.

It is the difference between deposition from first a deflocculated, then a partially deflocculated, and then a slowly flocculating dispersion, plus the length: diameter ratio of the fibers, that spells the difference between the strata making up the microporous materials of the invention and the strata or layers of the prior applications and patents referred to above. Deflocculated separate fibers can align themselves in approximately the same plane as the layer. In the process of the invention, a major proportion of the fibers laid down in the first two strata are approximately parallel to the plane of the layer. By judicious slow flocculation of the remaining dispersed fibers, forming them into small clumps, the fibers thereafter are deposited upon the support uniformly, as flocks with some deflocculated fibers, and a proportion assumes an angle to the plane of the layer that is 30° or more. After all of the dispersing liquid has been drawn off, the deposited fibers are brought closer together, while the fibers projecting across the plane of the layer prevent too great an increase in the density of the microporous material, maintaining the open spacing responsible for the high voids volume in the top stratum, at the same time increasing the degree of interlocking and intermingling of fibers therein. The result is a material in which the fibers are firmly interlocked. The materials of the invention differ from materials in which the fibers are all laid down by suction, as in the paper-making process, or by pressure-flow-through exclusively, due to their fiber spacing (despite the generally parallel orientation), high voids volume, uniformity, and microporosity.

The compression and hence bulk density of the strata deposited can be varied by varying the differential pressure across the strata during deposition. The differential pressure is in turn dependent upon fluid velocity and viscosity, and the permeability of the fine intermediate stratum. For a given differential pressure, the layer density can be decreased by including a small amount of bulked or crimped coarse fibers which can support the finer fibers and space them better.

Under certain circumstances, it is desirable that shrinkage during drying of the layer be minimized, for example, to prevent the fibers from pulling away from each other. Shrinkage can be minimized by applying the dispersion in several applications, for example, in from two to six applications, while removing the material from the suspension between each application, and at the end of the laydown applying a differential pressure of up to about 100 p.s.i. Greater pressures are preferably avoided before solidification of the binding agent, in order to prevent any possible reorientation of the angularly oriented fibers. The liquid binding agent, if any, contained in the coating dispersion can, if desired, be caused to solidify between the several applications of the dispersion. Alternatively, solidification can be effected after complete application.

When fibers are deposited on a foraminous support, tortuous passages of varying sizes exist between the fibers. These passages in the various strata have a mean pore size which in the aggregate determines the effective minimum pore diameter of the layer, and which depends on:

(1) The dimensions (diameter or diameter and length) of the fibers.
(2) The shape of the fibers.
(3) Internal structure (as for example, when diatomite particles are used).
(4) The average distance between adjacent fibers.
(5) The state of aggregation and uniformity of spacing of the fibers.

Fine and coarse fibers may be combined and blended to produce a layer having in the aggregate of the strata an intermediate mean pore diameter dependent on the proportions of the particles. Different sizes of fibers can be deposited in different regions of the layer, thus producing a gradation in pore size.

A binding agent can be and preferably is used in conjunction with each stratum. The binding agent can be flowed through the strata as a final operation, or any of the binding agents mentioned above can be added to the dispersion before it is applied to the base. The binding agent can also be incorporated in the strata after deposition, if it has a deleterious effect upon the dispersion. It can for example be washed through the strata after the fluid has been drawn off, or it can be deposited on the surface of the layer, whence it will spread by capillarity throughout all the strata.

After the deposition has been completed, adhesion of the individual fibers to one another is effected. The conditions necessary to accomplish this vary with the nature of the binding agent and for heat- or solvent-activatable fibers and for particulate material. For example, the temperature can be raised to a point high enough to cause the cross-linking or polymerization thereof, or to cause the evaporation of the solvent. Alternatively, in the case of a thermoplastic material, the temperature can be increased to effect softening or fusion, or sintering or brazing. A catalyzed resin can be allowed to stand at room temperature until the resin is set.

If it is necessary to raise the temperature of the product to cure or soften the binder, a curing oven can be provided, through which the material is passed after the deposition is complete. The product can also be dried in this oven, if desired, to remove any remaining portion of the dispersing liquid. Alternatively, the binding agent can be caused to solidify by passing heated air or other heated gases through the product.

The microporous materials of the invention can be formed in any desired form or configuration, with or without a support. They can be set in the desired configuration by using a heat setting or curing binder and/or fibers and/or particulate material, which is cured after forming the material into the desired shape, so as to set it into that shape. Thus, for instance, the microporous sheet materials of the invention after laydown can be stripped from the support or left on the support, and then formed into a corrugated configuration, following which they can be put into the form of a filter element, as, for example, by folding the corrugated sheet into a cylindrical form, lapping over the free ends of the sheet, and binding them, to complete the cylinder. This cylinder can be end capped, if desired, after which the binder present in the layer during or after formation can be set. The result is a rigid structure in which the microporous sheet material is quite resistant to deformation or distortion under rather high fluid pressures. The preceding is given merely as an example. It will be apparent that any desired configuration can be adopted.

If desired, the microporous materials of the invention can also be laminated to other materials. The binder present can serve as a bonding agent for binding the material to other components of the laminate.

Multilayered materials can also be formed from combinations of two or more sheet materials, of which at least one and preferably each is separately prepared in accordance with the process of the invention. Self-supporting sheets of particulate material can be laid down on the wire mesh support, stripped off, then juxtaposed and bonded or laminated together to form a multiplayered sheet. Such sheets can have differing porosities, or pore sizes, so that for instance, a top layer can be thick and coarse, and serve as depth filter, while an intermediate or bottom layer can be fine, and serve to screen out all small particles passing the coarse layer and above a certain minimum size.

Multilayered materials can also be formed by separately laid-down coated substrates, of which each one and preferably each is prepared in accordance with the invention, juxtaposed and bonded or laminated together. The substrate layer can be on the outside, or the layers can be superimposed, the top layer of one sheet adjacent to the substrate layer of the next sheet.

A desirable bonding technique is to juxtapose the sheets with the binder in a position to bond the sheets together, and then corrugate and bond the sheets simultaneously. If the binder is of the curing or setting type, such as a vulcanizable rubber, a partially cured thermosetting resin, or an epoxy resin, the corrugation folds will also be set in the resulting laminate at the same time.

As the binder for bonding the several sheets or layers together in a multilayered structure, there can be used any of the binders referred to heretobefore for binding the particulate material to itself and to any substrate that may be present. Also suitable for powdered or fluidized thermoplastic or curing thermoplastic or thermosetting resins, such as nylon, butadiene-acrylonitrile resin, polyesters, epoxy resins and urea-formaldehyde resins. If the particulate material and/or the substrate (if any) are of thermoplastic or solvent-tackifiable material, the composite can be heated to the softening temperature thereof or wetted with solvent to effect the bonding by such materials.

Exemplary multilayer structures that are especially advantageous are the following:

great and causes the microporous layer to rupture. This is easily observable by the increased bubbling of the liquid immersion medium. The maximum air pressure achieved before rupture is a measure of the adhesion. When the average pore diameter of the microporous layer exceeds 0.3 micron, the differential pressure of the medium at the flow rate through the medium at rupture should be calculated, and this differential pressure subtracted from the total pressure at rupture to yield the actual pressure causing rupture. At pore diameters below 0.3 micron, the differential pressure can safely be disregarded.

The voids volume of the material is determined by measuring apparent volume and true volume. The apparent volume of the microporous material or layer is determined by measurement of the area and thickness of the material or layer. The true volume is determined by fluid displacement techniques using a fluid capable of wetting all of the components of the product. The voids volume is then determined by the following equation:

$$\text{Voids volume} = 100 \times \left[1 - \frac{\text{true volume of layer}}{\text{apparent volume of layer}}\right]$$

Calculated by this method, the microporous materials produced by means of this invention have microporous layers with voids volumes of at least 75% and in some instances 85% and even higher.

The pore size or diameter of the microporous materials of this invention was evaluated by the following test which is substantially in accordance with the procedure of U.S. Pat. No. 3,007,334.

A disk of material to be tested is wetted wtih a fluid, preferably ethyl alcohol, capable of wetting the microporous layer, and clamped between rubber gaskets. A fine screen is positioned above the disk supporting it against upward movement. The volume above the disk is filled with the fluid. Air pressure is increased in the chamber below the disk until a stream of air bubbles is observed emerging from one point of the test piece. The effective pore diameter is then calculated by the well known formula:

$$\text{pore diameter (microns)} = \frac{K}{\text{pressure (inches of water)}}$$

| | A | B | C | D | E | F |
|---|---|---|---|---|---|---|
| Top layer: | | | | | | |
| (a) Particulate material | Fine fibers and diatomaceous earth. | Diatomaceous earth. | Fine binders and diatomaceous earth. | Fine fibers and diatomaceous earth. | Fine fibers and diatomaceous earth. | Fine fibers and diatomaceous earth. |
| (b) substrate | Paper. | Paper. | Paper. | Paper. | Paper. | Paper. |
| Bottom layer: | | | | | | |
| (a) Particulate material | Fine fibers. | Fine fibers. | Fine fibers and diatomaceous earth. | Coarse fibers. | Coarse fibers and diatomaceous earth. | Fine fibers stratum coarse fibers stratum. |
| (b) Substrate | Paper. | Paper. | Paper. | Paper. | Paper. | Paper. |

Such multilayered structures have much greater strength, especially when corrugated and the corrugations set by a cured binder.

The adhesion obtained between the fibers in the layer can be quite high, particularly when a binder or activatable fibers or particulate material is used. As a result, the strength of the final product is dependent primarily upon the strength of the fibers and binder. A convenient and meaningful method of measuring the adhesion developed in the fiinal product is to form the product into a flat sheet having a surface of $\frac{1}{20}$ square foot, with the microporous layer on the support, if there is one, being on the upper surface. The sheet is clamped in a device which permits fluid to be held on the upper surface, while the lower side is connected to a source of air pressure. The fluid which is in contact with the upper surface is one with which it is wetted, as for example, water or alcohol. Air is then gradually admitted to the lower side, a pressure gauge being employed to measure the buildup of pressure. Ultimately, the pressure exerted by the air becomes too This formula is discussed in WADC Technical Report 56–249, dated May 1956, entitled "Development of Filters for 400° F. and 600° F. Aircraft Hydraulic Systems" by David B. Pall, and available from the ASTIA Document Service Center, Knott Building, Dayton, Ohio. A detailed description of the bubble point test and determination of pore size from the maximum particle passed will be found in Appendix I of this report. See also U.S. Pat. No. 3,007,334, dated Nov. 7, 1961, to David B. Pall.

K is determined by measuring the maximum spherical glass bead or carbonyl iron particle which passes through the element, in accordance with WADC Technical Report 26–249 and MIL–F–8815 (ASG) paragraph 4.7.8 (Mar. 18, 1960), or the largest bacteria which passes through.

The pore diameter obtained by this method is the maximum pore diameter. By continuing to increase air pressure until the whole surface of the filter medium is bubbling (known as the "open bubble point"), the same constant can be used to compute an average diameter characteristic of most of the pores. Tests have shown that if air is passed at a velocity of 70 to 170 cm./min., the pressure necessary to achieve the open bubble point taken together with the K value given above gives a value for the pore opening approximating the true average value.

Figure 1:
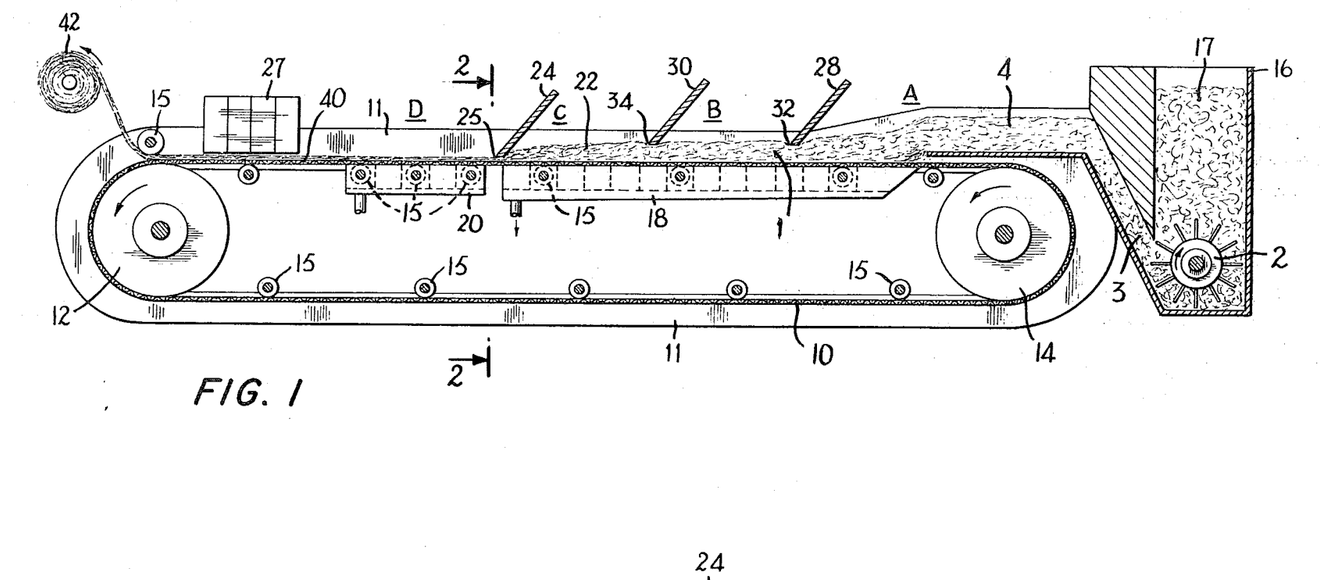
FIG. 1 is a schematic view of an apparatus for forming microporous fibrous sheet materials substantially uniform in thickness and density and porosity.
Figure 2:
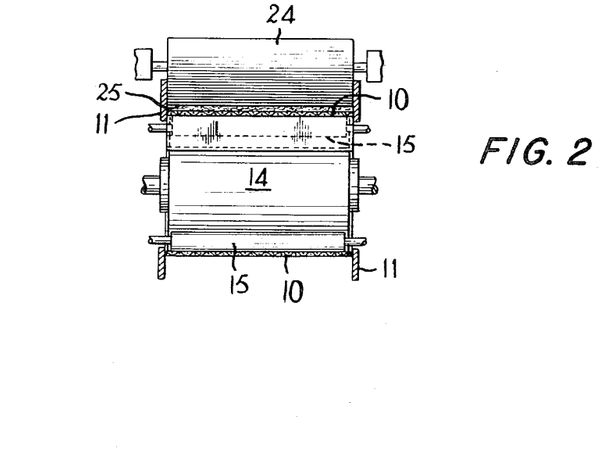
FIG. 2 is a cross sectional view of FIG. 1 along the lines 2—2.

THE APPARATUS OF FIGS. 1 AND 2

The apparatus as shown in FIGS. 1 and 2 comprises an endless Fourdrinier wire mesh belt 10, which is driven by two spaced-apart rolls 12 and 14, over a plurality of guide rolls 15. The belt travels between closely abutting side frames 11, which engage the edges of the belt in a fluid tight seal, and with the belt as the moving bottom constitute a reservoir to retain a slurry of particulate material on the belt to the desired depth. A head box 16 for delivering a slowly flocculating slurry of particulate material to the wire belt is positioned in close proximity to the roll 14, which is the breast roll, and belt 10. The head box includes a paddle wheel 2 which creates a shearing action at the head of feed passage 3 through which slurry is led to the belt 10. The passage has a long horizontal end portion 4 or apron which transfers the slurry to the belt 10, and transit time through this is long enough to permit flocculation to begin. By the time the slurry reaches the belt, it is partially flocculated.

A series of gravity drainage boxes 18 and vacuum or suction boxes 20 and a series of dryers 27 are disposed in close proximity to the wire belt 10. Immediately prior to the vacuum boxes 20 and between the gravity boxes 18 and the vacuum boxes 20, a primary deflocculating blade 24 in the form of a stainless steel blade having a thickness of about 0.010 to 0.015 inch is adjustably disposed above and across the wire belt 10 to define a gap 25, from about 0.01 to about 0.5 inch high, and inclined in the direction of flow at an angle to the wire belt within the range from about 30 to about 45°. The gap is adjusted so as to restrict fluid flow, and build up a predetermined head or depth of slurry 1 on the belt in the relatively quiescent zones A, B, C, of gravity drainage, so as to control gravity settling at a desired rate there, and also reduce the depth of the slurry on the wire belt over the vacuum box to the desired depth, and break up large flocs and clumps of particles in the slurry before the slurry is drawn down on the support over the vacuum boxes 20.

Disposed between the primary deflocculating blade 24 and the head box 16 in the quiescent zones A, B, C are auxiliary deflocculating blades 28 and 30. The auxiliary deflocculating blades 28 and 30 are disposed above and across the wire belt 10 to define gaps 32 and 34, respectively. The gaps defined by blades 28 and 30 are from about 2.5 to about 0.2 inch high, and the blades are inclined with flow at an angle to the wire belt within the range from about 30 to about 45°. As indicated hereinbefore, the auxiliary deflocculating blades are especially important in the case of a slow draining slurry, to break up large flocs in the slurry in this zone.

In carrying out the method of the invention, using the apparatus as shown in the figures, feed stock or slurry 17, such as an aqueous slurry of asbestos fibers, is fed from the head box 16 onto the wire mesh belt 10 in zone A where it is retained by the blade 28, within the reservoir created by sides 11 of a depth of, for example, about three inches, and then passed through gap 32 into zone B, where depth is controlled by blade 30 to, for example, about two inches, initially, and then through gap 34 into zone C, where depth is controlled by blade 24, to, for example, about 1.5 inches, and finally through gap 25 into zone D over the vacuum boxes 20. In zone A, about 5 to 10% of the slurry fluid drains quickly by gravity through the wire mesh belt, to form the initial stratum. The slurry is only partially deflocculated, if at all, at this stage. Thereafter, flocs present in the slurry which are larger than gap 32 are broken up, as the slurry passes through gap 32 into zone B. In zone B, another 5 to 10% of the slurrying fluid of the dispersion, which has now become from 80% to 100% flocculated, gravity- drains through the wire mesh belt forming the first portion of the intermediate stratum 22. It then passes beneath the blade 30 into zone C, and by the end of zone C, from about 15 to about 75% of deflocculated particulate material in the flocculated slurry, which is substantially free of large flocs, has gravity-settled on the mesh belt to form an intermediate stratum 22.

The supernatant slurry of particulate material above the initial layer is passed through the gap 25 beneath blade 24, and as the slurry flows through the gap and enters zone D the turbulence on the head box side breaks up large flocs in the slurry and reduces the depth of the slurry to the approximate width of the gap. The fibrous material distribution in the slurry over the vacuum boxes 20 is now uniform. Immediately thereafter, while the slurried flocculated fibrous material is still uniformly distributed, and before large nonuniform flocs can form, the remaining supernatant slurrying liquid is drawn off over the vacuum boxes 20, through the initial and intermediate strata, and through the mesh belt, and the remaining flocculated fibrous material is laid down as the top stratum of the layer, thereby forming a tri-stratate fibrous sheet material 40 substantially uniform in thickness and density. The sheet is then passed under the dryer 27, and thereafter stripped from the mesh belt, and rolled up at 42.

The barrier means or deflocculating blade or blades are ordinarily a thin plate of wood, glass, metal, such as stainless steel, or plastic, and have a straight edge disposed across the wire mesh belt and parallel thereto. These can be provided with adjusting screws to vary the height and thickness, as is well known in the art. Such blades, often referred to as doctor blades, should be at least as wide as the support, to ensure that substantially all slurried material must pass under the blade. In addition, the length of the blades is dependent upon type and rate of drainage of the slurry, and width, pore size and speed of the wire mesh support.

The barrier means can also be in the form of a bar, plate, roll, or wedge. All such forms are referred to generically herein as "bar" or "barrier."

The bar or barrier can be attached to an overhanging support, or can be an extension of the head box or the vacuum boxes. It is to be understood that the structure by which the bar is supported, the configuration of the bar, and the material of which the bar is made can be any conventional support, configuration or material, and these do not form any part of this invention.

The following examples in the opinion of the inventors represent preferred embodiments of the invention.

EXAMPLE 1

The apparatus shown in FIGS. 1 and 2 was used in the following way to prepare a fibrous sheet of uniform thickness and density, suitable for use as a filter medium, by coating an alpha cellulose-hemp paper substrate with asbestos fibers.

The deflocculating blades 24, 28 and 30 were stainless steel strips, 42 inches in length and about 0.010 to 0.015 inch in thickness. The primary deflocculating blade 24 was positioned between the vacuum box and head box about 9/10 of the distance from the head box, and disposed above and across the wire mesh belt 10 at an angle of 40° to the mesh belt, and defined a gap about 0.024 inch higher over the mesh belt. The auxiliary deflocculating blades 28 and 30 were positioned between the blade 24 and the head box about 8 inches from each other, blade 30 being about 8 inches from blade 24 and blade 28 being positioned at the beginning of belt 10. Blades 28 and 30 were inclined at an angle of 40° to the belt and formed a gap of about 0.375 inch above the belt 10. The wire mesh belt contained openings 0.008 inch x 0.012 inch.

A slurry of crocidolite asbestos was prepared by mixing 1500 gallons of water with 75 pounds of crocidolite asbestos fibers averaging 0.01 micron in diameter and 30 microns in length. The slurry of asbestos was poured into the head box, and was fed therefrom at a rate of about 9 gallons/min. onto the substrate, an alpha cellulose and hemp paper, with 25% polyvinylidene chloride as a binder, weight 4 g./sq. ft. thickness 0.005 inch, supported on a wire mesh belt traveling at a rate of 9 ft./min. In zone A, the slurry depth was 1.5 inches, a portion of the water drained quickly through the belt, and there was formed an initial stratum 0.001 inch thick on the substrate, from about 5% of the fibers present.

The slurry of asbestos on the substrate then moved beneath blade 28 through the 0.375 inch gap between the blade and the mesh belt, which broke up the few flocs that had formed, into zone B. In zone B, the slurry depth was 0.75 inch. The slurry passed beneath blade 30, where the large flocs were broken up, and into zone C, where the slurry depth was 0.375 inch. A portion of the water continued to gravity-drain through the substrate in zones B and C, and about 15% of the asbestos fibers in the slurry had gravity-settled on the substrate by the end of zone C, within about 25 seconds, to form an intermediate stratum about 0.002 inch thick.

The substrate, coated with the initial and intermediate strata and the remaining water and asbestos fibers of the slurry, was passed beneath the blade 24, in the course of which the large flocs present broke up, and the combined depth of the water and asbestos slurried therein and the thickness of the initial and intermediate strata of asbestos plus the substrate was reduced to about 0.025 inch. In zone D, the slurry and initial layer of asbestos were then passed over the vacuum box, where, before large flocs could reform, the remaining water was drawn through the substrate and mesh belt, depositing the remaining flocculated asbestos fibers on the initial layer of fibers in a manner such as to produce a top stratum thereon which had a substantial proportion of fibers extending across the plane of the layer at an angle of at least 30°. The fibrous coated substrate was of substantially uniform thickness, about 0.012 inch.

Thereafter, the fibrous layer and substrate was passed under the dryers, dried, and then removed from the wire mesh belt.

The final product was an asbestos-coated paper sheet having a maximum pore diameter of about 0.35 micron, an average pore diameter of about 0.1 micron; a water permeability of about 0.5 gal./min./ft.$^2$ at an applied pressure differential of about 1 lb./in.$^2$; and a voids volume of about 91%. The dried sheet had a substantially uniform thickness of about 0.014 inch with an asbestos layer about 0.009 inch thick; and a substantially uniform density of about 18 lb./ft.$^3$; and was particularly suitable as a filter medium.

Microscopic inspection of a cross-section of the material showed three microporous strata. In the first two strata, nearly all of the fibers were in planes approximating the plane of the layer, and in the top stratum a proportion of the fibers were oriented at an angle of 30° or more to the plane of the layer.

EXAMPLE 2

The procedure of Example 1 was repeated, using glass fibers averaging 0.1 micron in diameter and 400 microns long, in place of the crocidolite asbestos fibers. The position of the deflocculating blade 24 was adjusted so that the gap between the bottom edge of the blade 24 and the wire mesh screen was 0.06 inch.

The slurry of glass fibers was prepared by mixing 1500 gallons of water with 12 pounds of the glass fibers. The slurry of glass fibers was fed from the head box at a rate of 27 gallons/min., onto the paper substrate on the wire mesh belt, traveling at 9 ft./min., and allowed to gravity-settle through zones A to C for about 25 seconds, during which time about 50% of the glass fibers in the slurry gravity-settled on the paper, to form an initial stratum 0.001 inch thick, and an intermediate stratum 0.002 inch thick. The slurry then entered zone D, where the remaining liquid was drawn through, and the coated substrate was then dried.

The final product was a glass-coated paper sheet of substantially uniform thickness, about 0.008 inch, and of substantially uniform density, about 15 lb./ft.$^3$. The sheet had a maximum pore diameter of about 0.7 micron; an average pore diameter of about 0.4 micron; a water permeability of about 100 gal./min./ft.$^2$ at an applied differential pressure of about 1 lb./in.$^2$, and a voids volume of 95%.

Microscopic inspection of a cross-section of the material showed three microporous strata. In the first two strata, nearly all of the fibers were in planes approximating the plane of the layer, and in the top stratum a proportion of the fibers were oriented at an angle of 30° or more to the plane of the layer.

When glass fibers averaging 3.0 microns by 5000 microns were used in place of the smaller diameter glass fibers, a gap of 0.1 inch between the edge of the blade 24 and the wire mesh belt was employed. The slurry of glass fibers containing 0.1% by weight glass fibers was allowed to gravity drain through zones A to C for about 10 seconds, during which time 70% of the glass fibers in the slurry settled on the paper substrate to form an initial layer stratum and an intermediate stratum 0.001 and 0.005 inch thick. The remaining liquid was drawn through in zone D, forming after drying as the final product a sheet of substantially uniform thickness, about 0.010 inch thick, and of substantially uniform density, about 8 lb./ft.$^3$. The sheet had a maximum pore diameter of about 15 microns; an average pore diameter of about 5 microns; a water permeability of about 3000 gal./min./ft.$^2$ at an applied pressure differential of about 1 lb./in.$^2$; and a voids volume of about 97%. When the glass fiber sheet was held up near a source of light, substantially no light spots were observed in the sheet.

Microscopic inspection of a cross-section of the material showed three microporous strata. In the first two strata, nearly all of the fibers were in planes approximating the plane of the layer, and in the top stratum a proportion of the fibers were oriented at an angle of 30° or more to the plane of the layer.

EXAMPLE 3

The procedure of Example 1 was repeated, using a slurry of polyester fibers having an average size of 15 microns in diameter and 0.25 inch in length. The slurry of polyester fibers contained about 0.05% by weight polyester fibers.

The position of the blade 24 was adjusted so that a gap of 0.1 inch existed between the bottom edge of the doctor blade and the wire mesh belt. The slurry of polyester fibers was applied to the paper substrate on the wire mesh belt at a rate of about 10 grams/ft.$^2$, and allowed to gravity-settle through zones A to C for about 5 seconds, during which time about 70% by weight of the polyester fibers in the slurry gravity-settled on the paper substrate to form an initial stratum 0.001 inch thick and an intermediate stratum 0.001 inch thick. The remaining liquid was drawn through zone D, and the layer dried. The dried layer was sprayed while on the wire mesh belt with a solution of 95% $H_2O$, 4.95% acrylic resin latex and 0.05% ammonium thiocyanate as a binder. The layer was dried and aired at 350° F. for a few minutes.

The final polyester fiber-coated paper sheet had a substantially uniform thickness of about 0.007 inch, and a substantially uniform density, about 4 lb./ft.$^3$; a maximum pore diameter of about 100 microns; an average pore diameter of about 35 microns; a water permeability of about 1000 gal./min./ft.$^2$ at an applied pressure differential of about 1 lb./in.$^2$; and a voids volume of about 98%. When the polyester fiber sheet was held up near a source of light, substantially no light spots were observed in the sheet.

Microscopic inspection of a cross-section of the material showed three microporous strata. In the first two strata, nearly all of the fibers were in planes approximating the plane of the layer, and in the top stratum a proportion of the fibers were oriented at an angle of 30° or more to the plane of the layer.

EXAMPLE 4

The procedure of Example 1 was repeated, using in place of the crocidolite asbestos, cellulose fibers having an average diameter of about 20 microns and an average length of about 0.3 inch. The position of the blade 24 was adjusted so that the edge of the blade 24 was about 0.2 inch from the wire mesh belt, and the blades 28 and 30 were about 1 inch from the wire mesh belt.

A slurry of the cellulose fiber was formed which had a concentration of about 0.1% by weight of the cellulose fiber. The slurry of cellulose fiber was applied to the paper substrate on the wire mesh screen at a rate of about 15 grams/ft.$^2$, and allowed to gravity-settle through zones A to C for about 5 seconds, during which time about 60% of the cellulose fiber in the slurry gravity-settled on the substrate to form an initial stratum 0.003 inch thick and an intermediate stratum 0.006 inch thick. The remaining liquid was drawn through zone D, and the layer was dried. The dried layer was sprayed while on the wire mesh belt with a solution of 95% $H_2O$, 4.95% acrylic resin latex and 0.05% ammonium thiocyanate as a binder. The layer was dried and aired at 350° F. for a few minutes.

The final cellulose fiber sheet produced was of substantially uniform thickness, about 0.015 inch thick, and of substantially uniform density, about 98 lb./ft.$^3$; and had a maximum pore diameter of about 200 microns; an average pore diameter of about 50 microns; a water permeability of about 4000 gal./min./ft.$^2$ at an applied pressure differential of about 1 lb./in.$^2$; and a voids volume of about 98%. When the cellulose fiber-coated paper sheet was held up near a source of light, substantially no light spots were observed in the sheet.

Microscopic inspection of a cross-section of the material showed three microporous strata. In the first two strata, nearly all were in planes approximating the plane of the layer, and in the top stratum a proportion of the fibers were oriented at an angle of 30° or more to the plane of the layer.

EXAMPLE 5

The procedure of Example 1 was repeated, using in place of the crocidolite asbestos, uncalcined diatomaceous earth (Johns Manville Super Cel) having a size of about 5 microns. The position of the blade 24 was adjusted so that the edge of the blade 24 was about 0.08 inch from the wire mesh belt and the blades 28 and 30 were about 0.375 inch from the wire mesh belt.

A slurry of the diatomaceous earth was formed which had a concentration of about 0.1% by weight of the diatomaceous earth. The slurry of diatomaceous earth was applied to the paper substrate on the wire mesh screen at a rate of about 20 grams/ft.$^2$, and allowed to gravity-settle through zones A to C for about 10 seconds, during which time about 70% of the diatomaceous earth in the slurry gravity-settled on the substrate to form an initial stratum 0.002 inch thick and an intermediate stratum 0.008 inch thick. The remaining liquid was drawn through in zone D. and the layer dried. The dried layer was sprayed while on the wire mesh belt with a solution of 95% $H_2O$, 4.95% acrylic resin latex and 0.05% ammonium thiocyanate as a binder. The layer was dried and aired at 350° F. for a few minutes.

The final sheet produced had a substantially uniform thickness of about 0.02 inch, a substantially uniform density, about 10 lb./ft.$^3$, and a maximum pore diameter of about 5 microns; an average pore diameter of about 1 micron; a water permeability of about 10 gal./min./ft.$^2$ at applied pressure differential of about 1 lb./in.$^2$; and a voids volume of about 82%. When the diatomaceous earth-coated paper sheet was held up near a source of light, substantially no light spots were observed in the sheet.

EXAMPLE 6

The apparatus shown in FIG. 1 was used to prepare a fibrous filter sheet having a substrate of alpha cellulose and hemp paper coated with a layer comprising 15% fibrous glass and 85% diatomaceous earth.

The deflocculating blades 24, 28 and 30 were stainless steel strips 42 inch in length and about 0.010 to 0.015 inch in thickness. The primary deflocculating blade was positioned between the vacuum box and head box about 9/10 of the distance from the head box, and disposed above and across the wire mesh belt at an angle of 40° to the belt, and defined a gap of about 0.024 inch high over the mesh belt. The auxiliary deflocculating blades 28 and 30 were positioned between the blade 24 and the head box about 8 inches from each other, blade 30 being 8 inches from blade 24 and blade 28 being positioned at the beginning of belt 10. Blades 28 and 30 were inclined at an angle of 40° to the belt and formed a gap of about 0.375 inch above the belt.

A slurry was prepared of glass fibers having an average diameter of 0.62 microns, and an average length of 1200 microns, together with uncalcined diatomaceous earth (Johns Manville Super Cel) in the proportion 15% glass fibers and 85% diatomaceous earth. The slurry was poured into the head box and was applied therefrom in an amount of about 9 gal./min. onto the alpha cellulose and hemp paper substrate, containing 25% polyvinylidene chloride as a binder, weight 4 g./sq. ft., thickness 0.005 inch. The wire mesh belt traveled at a rate of 9 ft./min. In zone A the slurry depth was 1.5 inches. The slurry moved on the mesh belt to the end of zone A and then beneath blade 28 which broke up a few flocs that had formed larger than the 0.375 inch gap between the blade and the mesh belt. in zone B the slurry depth was 0.75 inch. The slurry passed beneath blade 30 which broke up flocs and into zone C where the slurry depth was 0.375 inch. A portion of the water gravity drained through the mesh in zones A, B and C, and about 50% of the total solids in the slurry had gravity-settled on the mesh belt by the end of zone C within about 25 seconds to form an initial stratum 0.002 inch thick and an intermediate stratum 0.004 inch thick.

The remaining supernatant slurry was passed beneath the blade 24 which broke up the large flocs present and reduced the combined depth of the slurry, and the thickness of the initial layer formed on the belt to about 0.025 inch. In zone D the slurry and initial layer were then immediately passed over the vacuum box 20 where the remaining water was drawn through the mesh belt before large flocs could reform, depositing the remaining flocculated glass fibers and diatomaceous earth on the initial layer in a manner so as to produce a fibrous sheet of substantially uniform thickness about 0.022 inch on the mesh belt. Thereafter, the fibrous layer and substrate was passed into the dryers, and the remaining water removed. The layer and substrate were then saturated with a solution of 90% water, 10% butadiene-acrylonitrile latex, and cured at 330° F. for 20 minutes.

The final sheet had a substantially uniform thickness of about 0.02 inch and a substantially uniform density about 10 lb./cu. ft., a maximum pore diameter of about 5 microns, an average pore diameter of about 1 micron, a water permeability of about 1 gal./min./sq. ft. at an applied differential pressure of about 1 lb./sq. in., and a voids volume of about 82%. When the sheet was held up near a source of light, substantially no light spots were observed.

Microscopic inspection of a cross-section of the material showed three microporous strata. In the first two strata, nearly all of the fibers were in planes approximating the plane of the layer, and in the top stratum a proportion of the fibers were oriented at an angle of 30° or more to the plane of the layer.

EXAMPLE 7

Example 6 was repeated, substituting as the substrate a nonwoven mat of polyester monofilaments. The mat weight was 3 g./sq. ft., the thickness 0.020 inch, and the filaments' denier 1.5.

After the substrate had been coated with the glass fiber-diatomaceous earth mixture and dried, it was stripped from the belt, and then passed over a fluidized bed of diisocyanate-cured epoxy resin powder to pick up a total of 0.5 g./sq. ft. of the powder which served as the binder. The glass fiber-coated alpha cellulose-hemp paper of Example 2 was passed over the fluidized bed to the same pick up. The first sheet was then juxtaposed as a top layer with the glass fiber-coated alpha cellulose-hemp paper of Example 2 as the bottom layer, and the two layers then corrugated together in a corrugating apparatus at a back pressure of 12 lbs./sq. inch and at 330° F., so as to melt the epoxy resin powder, causing it to impregnate the two layers and bond them together during the corrugation. The resulting corrugated material had the corrugations set in position by the action of the binder which was cured at the same time. The resulting bilayered product had a maximum pore diameter of 3 microns and an average pore diameter of 0.9 micron, a water permeability of 10 gal. sq. ft. at an applied pressure differential of 1 lb. sq. inch, and a voids volume of 89.7%.

Figure 3:
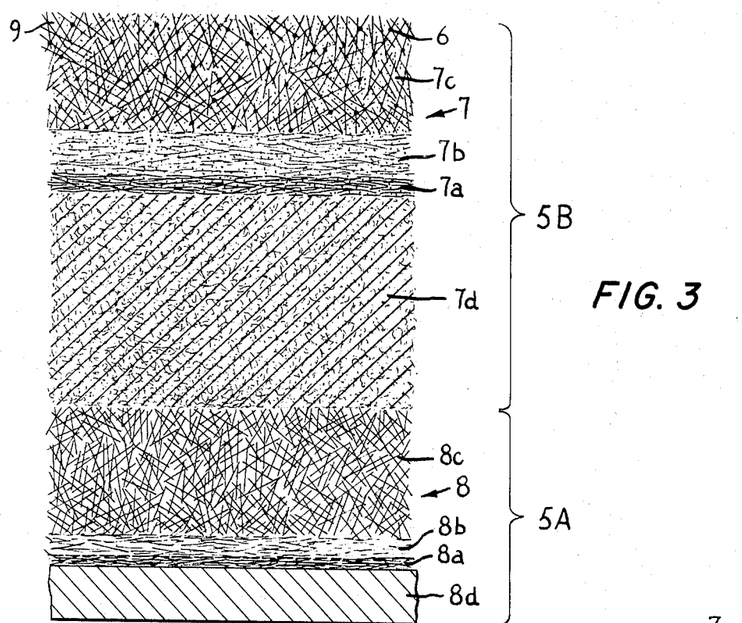
FIG. 3 represents a cross-sectional view through a multilayer tri-stratum microporous material of the invention, showing the fibers of the first two microporous strata extending generally in the plane of the layer, and the proportion of fibers of the layer extending at an angle greater than about 30° to the plane in the top stratum of the layer, and the high voids volume there, due to the wide spacing of the fibers.

FIG. 3 is a view on a greatly magnified scale of a cross section through a very small portion of the microporous material produced in accordance with this example, showing a portion of the bottom sheet 5A, the coated substrate of Example 2, having a paper substrate 8d with a microporous layer 8 of glass fiber with three strata 8a, 8b, and 8c, the first two strata 8a, 8b, having fibers lying almost entirely in planes approximately parallel to the plane of the layer, and a proportion of fibers in the top stratum 8c extending across the plane of the layer at an angle thereto of at least 30°, and the top sheet 5B having a polyester mat substrate 7d with a microporous layer 7 composed of fibers and diatomaceous earth particles 9, in three strata 7a, 7b, 7c, with the fibers in the top stratum 7c oriented similarly to those in the top stratum 8c of the sheet 5A. The resin binder 6 is lodged at the points of crossing of the fibers throughout the two sheets and between the sheets, holding them in place. FIG. 3 shows that the outwardly extending fibers are present only in the top strata of the layers.

Figure 4:
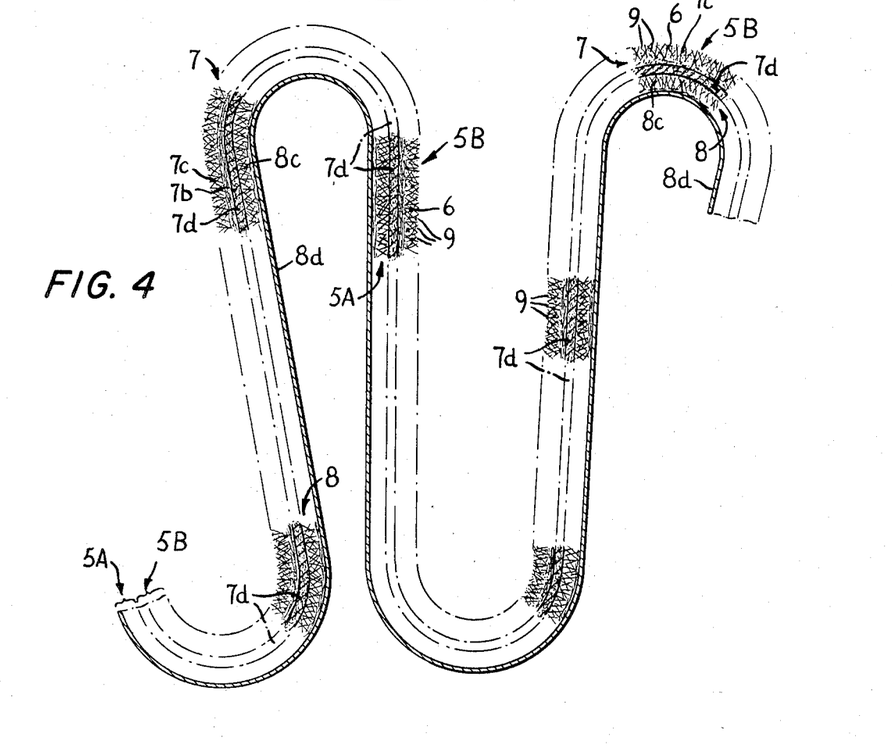
FIG. 4 is an enlarged cross-sectional view, with portions broken away, of a multilayer corrugated filter of the invention in corrugated form.

FIG. 4 shows a portion of a corrugated filter, prepared from this material, including several of the pleats or corrugations, with portions partly broken away and shown in cross-section, showing the bottom sheet 5A, the paper support 8d, the fibers of the layer 8 thereon, and the top sheet 5B with its substrate 7d, and the fibers and diatomaceous earth 9. The cross-sectional portions are taken at the external and internal bends, as well as at the substantially straight portions between the bends.

EXAMPLE 8

Example 7 was repeated, substituting as the top layer a diatomaceous earth-coated alpha cellulose-hemp paper prepared in accordance with the procedure of Example 5. The sheet of Example 2 was passed over a fluidized bed of the solid epoxy binder as before and coated with 0.5 g./sq. ft. of the epoxy powder. The sheet of Example 5 was then placed on top as the top layer, and the two layers passed through a corrugating apparatus as described in Example 7. In the corrugating process the epoxy resin binder was melted, and bonded the two layers together while it was being cured during the corrugating, so as to set the corrugations in the bilayered sheet. The product had a maximum pore diameter of 5 microns, an average pore diameter of 0.95 micron, a water permeability of 10 gal./min./sq. ft. at an applied pressure differential of 1 lb./sq. in., and a voids volume of 88%.

EXAMPLE 9

Using the apparatus described in Example 6, a filter sheet was formed without a substrate, from cellulose cotton layers and glass fibers. An aqueous slurry was prepared containing 90% cellulose cotton linters, diameter 20 microns, length 4 mm., and 10% of glass fibers, diameter 1 micron, length 2000 microns (2 mm.). The slurry contained 1500 gallons of water with 36 pounds of the cotton linters and glass fibers. This slurry was poured into the head box at a rate of 27 gallons per minute, and thereafter applied onto the wire mesh belt traveling at 9 ft./min. and allowed to gravity-settle through zones A to C for about 25 seconds, during which time about 50% of the cotton linters and glass fibers in the slurry gravity-settled on the mesh belt, forming an initial stratum 0.005 inch thick and an intermediate stratum 0.005 inch thick. The slurry then entered zone D, where the remaining liquid was drawn through. The sheet was then dried.

The final product was stripped from the wire mesh, and was self-supporting. The sheet was of substantially uniform thickness, about 0.021 inch, and of substantially uniform density, about 12 lbs./cu. ft. The sheet had a maximum pore diameter of about 25 microns, an average pore diameter of about 8 microns, a water permeability of about 160 gal./min./sq. ft. at an applied pressure differential of about 1 lb./sq. in., and a voids volume of 95%.

Microscopic inspection of a cross-section of the material showed three microporous strata. In the first two strata, nearly all were in planes approximating the plane of the layer, and in the top stratum a proportion of the fibers were oriented at an angle of 30° or more to the plane of the layer.

The invention is of particular application to the formation of filter material of either the depth filter or surface filter type. The filter material can be formed in pleats, convolutions, or corrugations, or in the form of thin sheets. Furthermore, the sheet materials formed by the process of the instant invention are useful as semi-permeable membranes for gases and liquids, and they can be used for the oxygenation of blood and for dialysis membranes and enclosed ecological systems, among the great variety of possible applications Having regard to the foregoing disclosure, the following is claimed as the inventive and patentable embodiments thereof:

1. An apparatus for forming porous sheet material substantially uniform in thickness, density, and porosity from a slurry of particulate material, which comprises, a foraminous support; means for delivering a slurry of particulate material to the support; means for retaining a layer of slurry on the support so that a portion of particulate material gravity-settles on the support and forms a layer thereon, and a portion of the slurrying fluid drains through the support barrier means disposed across the support and defining a narrow gap therebetween through which a layer of slurry containing suspended particulate material and the layer of particulate material formed on the support must pass, to establish before the barrier a relatively quiescent zone of slurry at a depth for gravity-settling and to break upflocs of particulate material contained in the slurry; means beyond the barrier to establish a second zone of slurry on the other side of the barrier of sufficient depth to allow flocculation and clumping of particulate material suspended in the slurry, and deposition of such flocculated and clumped particulate material on the support; and means for drawing the slurrying fluid through the support on the other side of the barrier by application of a differential pressure across the support, thereby forming a porous sheet material layer thereon, superimposed upon the first layer, and substantially uniform in thickness, density, and porosity.

2. An apparatus in accordance with claim 1, in which the barrier means is disposed across the support, inclined in the direction of fluid flow on the support, at an angle to the support within the range from about 30 to about 45°.

3. An apparatus in accordance with claim 2, wherein the barrier means is a deflocculating blade.

4. An apparatus in accordance with claim 1, wherein the barrier means disposed across the support defines a narrow gap therebetween within the range from about one to about five times the thickness of the finished sheet desired.

5. An apparatus in accordance with claim 1, wherein at least one barrier means is disposed across the support between the means for delivering slurried particulate material to the support and the means for drawing the fluid content of the slurry of the particulate material through the support, at a position at least ⅗ the distance from the means for delivering slurried particulate material to the support.

6. An apparatus in accordance with claim 1, including at least one auxiliary barrier means disposed in the quiescent gravity-settling zone between the barrier means and the means for delivering slurried particulate material to the support, the auxiliary barrier means being disposed above and across the support to define a gap therebetween within the range from about three to about thirty times larger than the gap between the barrier means and the support, to break up flocs in the slurry during gravity-settling.

7. In an apparatus for making sheets from particulate material by laydown from a slurry thereof, such as a paper making machine, which includes an endless wire mesh belt, a plurality of rolls about which the mesh belt travels, a head box for delivering feed stock to the wire belt, a vacuum box and a dryer, the improvement which comprises barrier means adjacent to, preceding, and in close proximity to the vacuum box, disposed across the belt at an angle to the belt inclined in the direction of fluid flow on the belt within the range from about 30 to about 45°, in a manner defining a gap therebetween within the range from about one to about five times the thickness of the finished sheet desired, through which a slurry of particulate material on the support can pass without build-up on the head box side of the barrier means, so as to establish a relatively quiescent zone of slurry at a depth for gravity-settling, and to break up flocs in the feed stock before the feed stock reaches the vacuum box.

8. An apparatus in accordance with claim 7, including means beyond the barrier to maintain a layer of slurry on the support of sufficient depth to allow flocculation and clumping of particulate material in the slurry in the zone beyond the barrier, and deposition of such flocculated and clumped particulate material on the support.

9. An apparatus in accordance with claim 7, wherein the barrier means is a deflocculating blade.

10. An apparatus in accordance with claim 7, including at least one auxiliary barrier means disposed in the quiescent settling zone between the barrier means and the head box, and above and across the mesh belt, to define a gap therebetween within the range from about three to about thirty times larger than the gap between the first barrier means and the mesh belt, to break up flocs during gravity-settling.

11. A method of forming microporous sheet material substantially uniform in thickness, density and porosity from a slowly flocculating slurry of a particulate material, which comprises flowing the slurry onto a foraminous support; flowing a portion of the slurrying fluid through the support and depositing thereon deflocculated fibers impeding further flow through the support and constituting an initial stratum; establishing a relatively quiescent layer of slurry at a predetermined head of fluid pressure less than 12 inches of water by means of a barrier defining a gap above the support narrower than the depth of the slurry on the support but wide enough to pass both slurry and particulate material deposited on the support, thereby allowing the particulate material to become at least partially flocculated while permitting the slurrying fluid to continue to drain through the support to form an intermediate stratum thereon, before the barrier, comprising a major proportion of deflocculated fibers of the slurry; breaking up large nonuniform flocs of particulate material in the supported slurry by passing the slurry through the narrow gap, and then depositing on the support the remaining flocculated and any deflocculated particulate material by draining off the remaining slurrying fluid while the slurry is still substantially uniform, and form a top stratum comprising such material with a proportion of the material oriented at an angle of at least 30° across the plane of the stratum and form a microporus sheet material substantially uniform in thickness, density and porosity 12. A method in accordance with claim 11, including the step of passing the slurry during formation of the initial and intermediate strata through at least one gap about three to about thirty times larger than the narrow gap through which the slurry is passed after formation of the intermediate stratum, to break up flocs of particulate material in the slurry.

13. A method in accordance with claim 11, wherein the initial and intermediate strata formed on the foraminous support comprise from about 10 to about 75% by weight of the particulate material in the slurry.

14. A method in accordance with claim 11, wherein the slurry passed through the narrow gap is reduced to a substantially uniform thickness within the range from about one to about five times the thickness of the final sheet desired.

15. A method in accordance with claim 11, wherein the particulate material comprises asbestos fibers.

16. A method in accordance with claim 11, wherein the particulate material comprises glass fibers.

17. A method in accordance with claim 11, wherein the particulate material comprises glass fibers and diatomaceous earth.

18. A method in accordance with claim 11, wherein the particulate material comprises cellulose fibers.

19. A method in accordance with claim 11, wherein the particulate material comprises diatomaceous earth.

20. A method in accordance with claim 11, wherein at least one additional layer of uniform thickness, density and porosity is attached to the sheet material.

21. A method in accordance with claim 11, including the step of interposing a porous substrate on the foraminous support as a base for laydown of the microporous sheet material, forming the microporous sheet thereon as a surface layer, adhering the layer to the substrate, and stripping the porous substrate and layer thereon from the support.

22. A method in accordance with claim 21, in which the substrate is paper.

23. A method in accordance with claim 21, in which the substrate is a nonwoven fibrous mat.

References Cited

UNITED STATES PATENTS

| | | | |
|---|---|---|---|
| 367,424 | 8/1887 | Merrill | 162—129 |
| 1,434,033 | 10/1922 | Witham | 162—308X |
| 1,927,359 | 9/1933 | Edge | 162—210 |
| 2,962,414 | 11/1960 | Arledter | 162—145 |
| 3,240,665 | 3/1966 | Robinson et al. | 162—312X |
| 3,246,767 | 4/1966 | Pall et al. | 210—505 |
| 3,252,270 | 5/1966 | Pall et al. | 210—505UX |
| 3,353,682 | 11/1967 | Pall et al. | 162—131X |

S. LEON BASHORE, Primary Examiner

FREDERICK FREI, Assistant Examiner

U.S. Cl. X.R.

162—145, 146, 149, 153, 156, 181, 188, 208, 310, 312; 210—505